United States Patent
Ichinose et al.

(10) Patent No.: US 7,631,189 B2
(45) Date of Patent: Dec. 8, 2009

(54) INFORMATION RECORDING DEVICE, INFORMATION REPRODUCING DEVICE, INFORMATION RECORDING MEDIUM, METHOD, AND COMPUTER PROGRAM

(75) Inventors: Tsutomu Ichinose, Tochigi (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 628 days.

(21) Appl. No.: 10/569,395

(22) PCT Filed: Sep. 1, 2004

(86) PCT No.: PCT/JP2004/012657

§ 371 (c)(1),
(2), (4) Date: Feb. 22, 2006

(87) PCT Pub. No.: WO2005/029493

PCT Pub. Date: Mar. 31, 2005

(65) Prior Publication Data

US 2006/0291361 A1 Dec. 28, 2006

(30) Foreign Application Priority Data

Sep. 18, 2003 (JP) ............................. 2003-326112

(51) Int. Cl.
*H04L 9/00* (2006.01)
*H04L 9/32* (2006.01)
*G06F 11/00* (2006.01)

(52) U.S. Cl. .................. 713/176; 713/177; 713/178; 713/179; 726/27; 726/28; 726/29; 726/30; 726/3; 726/4; 726/5; 726/6; 726/7

(58) Field of Classification Search .................. 380/228
See application file for complete search history.

(56) References Cited

U.S. PATENT DOCUMENTS

2001/0028318 A1 * 10/2001 Hogan .......................... 341/58
2005/0044083 A1    2/2005 Sako

FOREIGN PATENT DOCUMENTS

| JP | 2002-367282 | 12/2002 |
| JP | 2003-006997 | 1/2003 |
| JP | 2003-45128 | 2/2003 |
| JP | 2003-045128 | * 2/2003 |
| JP | 2003-303475 | 10/2003 |
| JP | 2004-507018 | 3/2004 |
| WO | WO 02/15185 | 2/2002 |

* cited by examiner

*Primary Examiner*—Longbit Chai
(74) *Attorney, Agent, or Firm*—K&L Gates LLP

(57) ABSTRACT

An apparatus for recording additional information hard to analyze in an information recording medium, a reproducer, a recording medium, a method, and a computer program for the same are provided. Bit values set at a plurality of DC control bit information setting positions set in a recording frame are decided based on constituent bit information of additional data, and additional data such as key information used for decoding contents is recorded in the information recording medium. In the reproducer, the additional data constituent bit information can be acquired by detecting the bit position set at a selected DC control bit storage position in the additional data-associated recording frame. With the configuration, it is possible to embed additional information such as key information used for decoding contents, key production information, contents reproduction control information, and copying control information with a format hard to analyze and also to accurately read out for data reproduction.

24 Claims, 16 Drawing Sheets

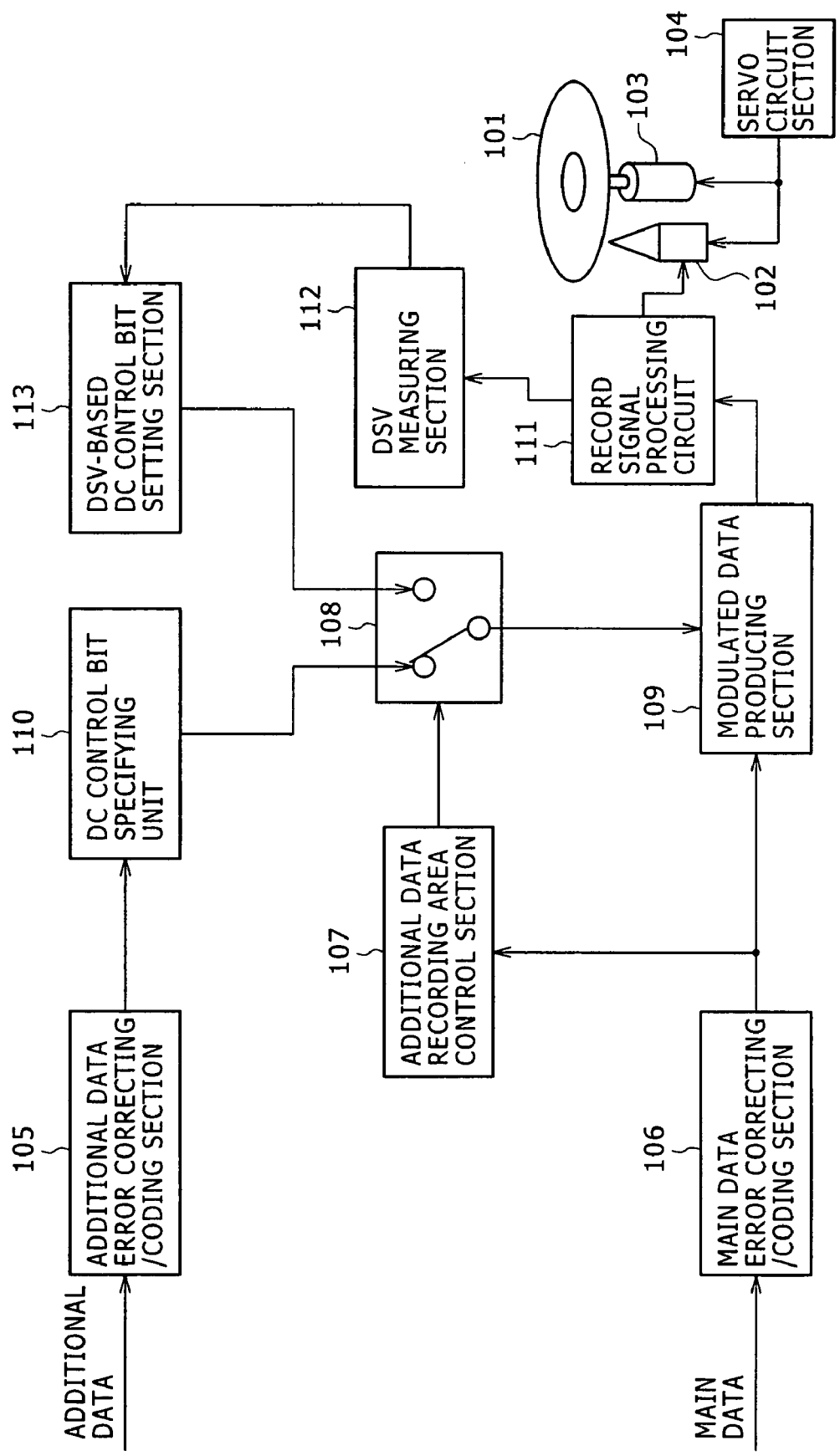

PHYSICAL CLUSTER

CONFIGURATION OF MODULATED RECORDING FRAME
1932 CHANNEL BIT

FIG.4

| INPUT DATA BIT | MODULATED DATA BIT |
|---|---|
| 00000000 | 010100100100 |
| 00001000 | 000100100100 |
| 000000 | 010100000 |
| 000001 | 010100100 |
| 000010 | 000100000 |
| 000011 | 000100100 |
| 0001 | 000100 |
| 0010 | 010000 |
| 0011 | 010100 |
| 01 | 010 |
| 10 | 001 |
| 11 | 000   PRECEDING MODULATION BIT = xx1<br>101   PRECEDING MODULATION BIT = xx0 |

FIG.9

| | DC CONTROL BIT | ADDITIONAL DATA BIT |
|---|---|---|
| (1) | [0,0,0]<br>[1,1,1] | 0 |
| (2) | [0,0,1]<br>[0,1,0]<br>[1,0,0]<br>[0,1,1]<br>[1,1,0]<br>[1,0,1] | 1 |

FIG.10

| | DC CONTROL BIT | ADDITIONAL DATA BIT |
|---|---|---|
| (1) | [0,0,0]<br>[1,1,1] | 00 |
| (2) | [0,0,1]<br>[0,1,0] | 01 |
| (3) | [1,0,0]<br>[0,1,1] | 10 |
| (4) | [1,1,0]<br>[1,0,1] | 11 |

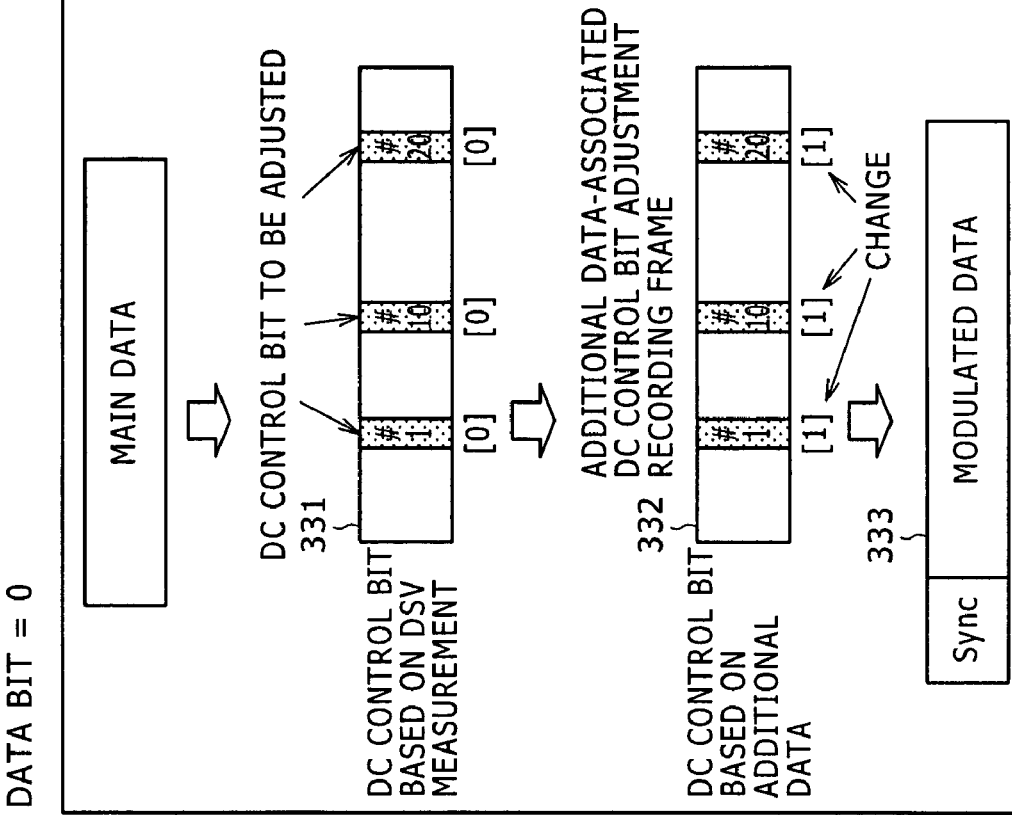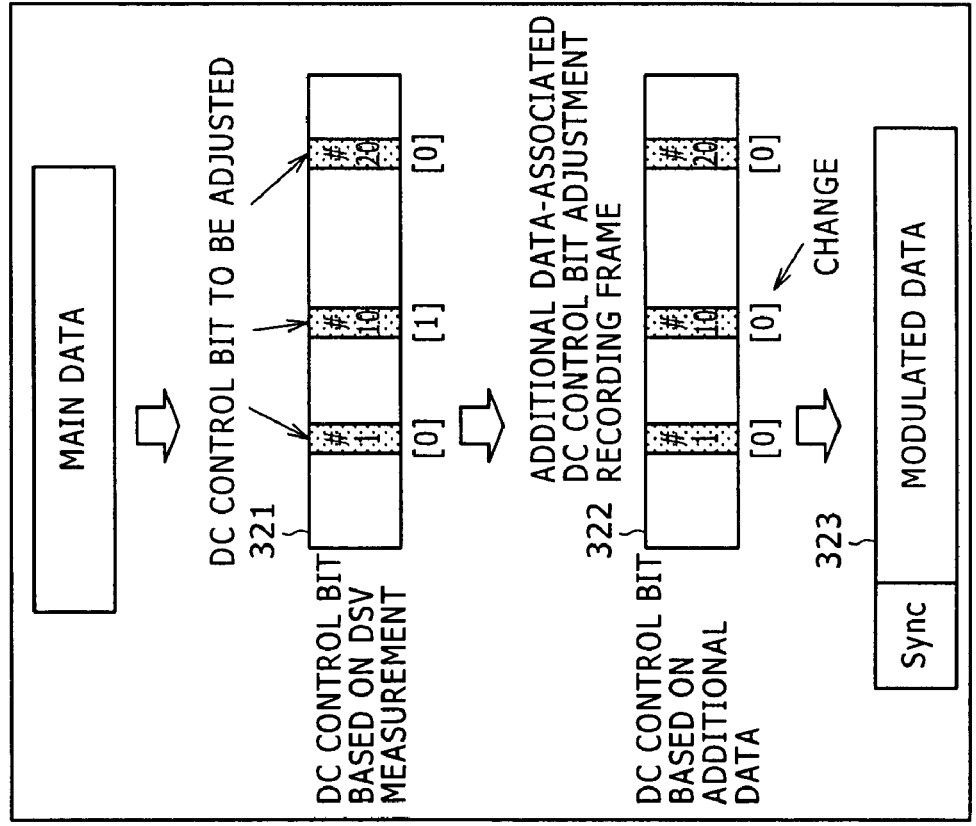

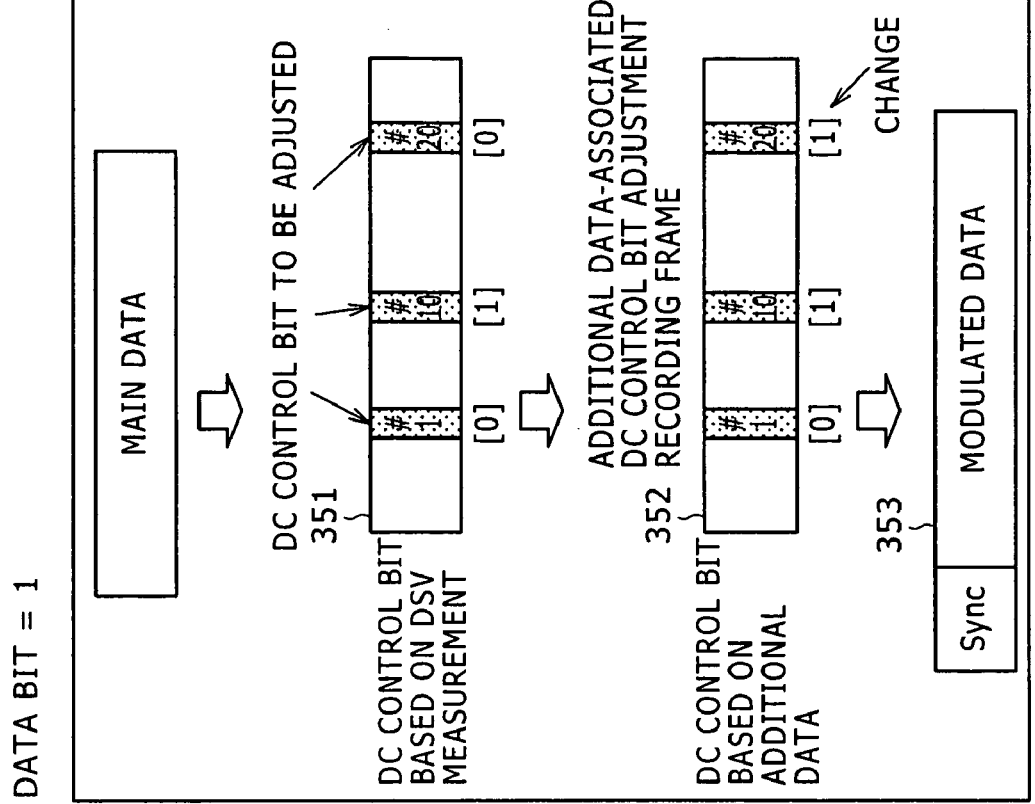
FIG.12(a) (2) ADDITIONAL DATA BIT = 1 FIG.12(b)
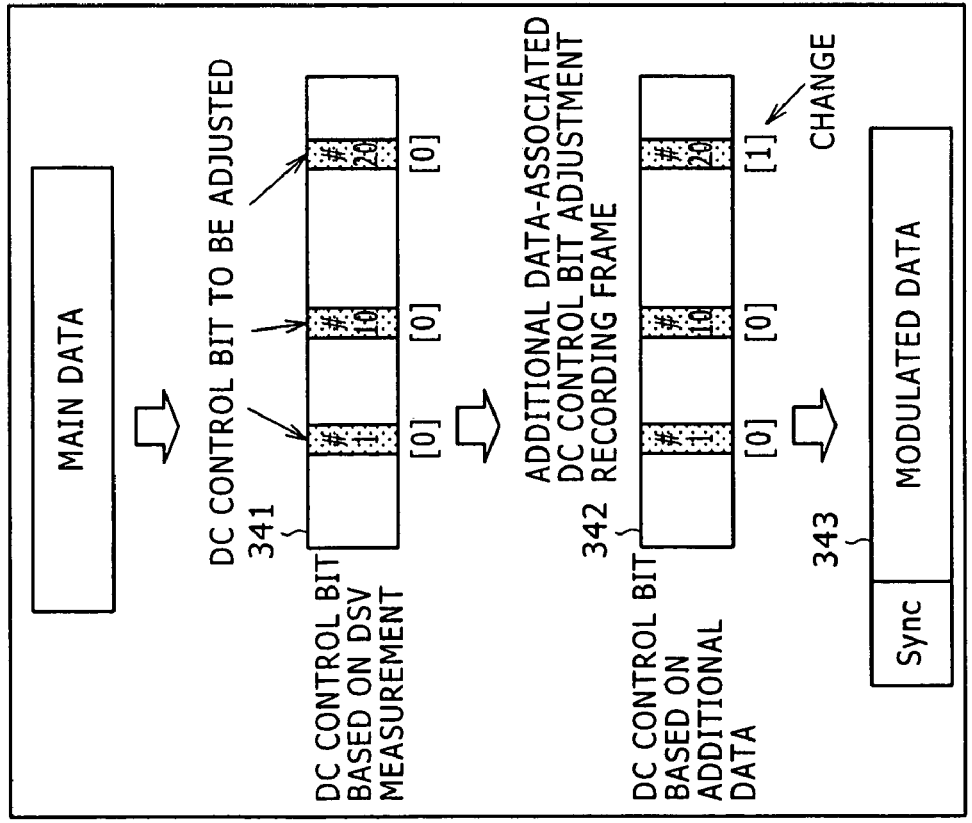

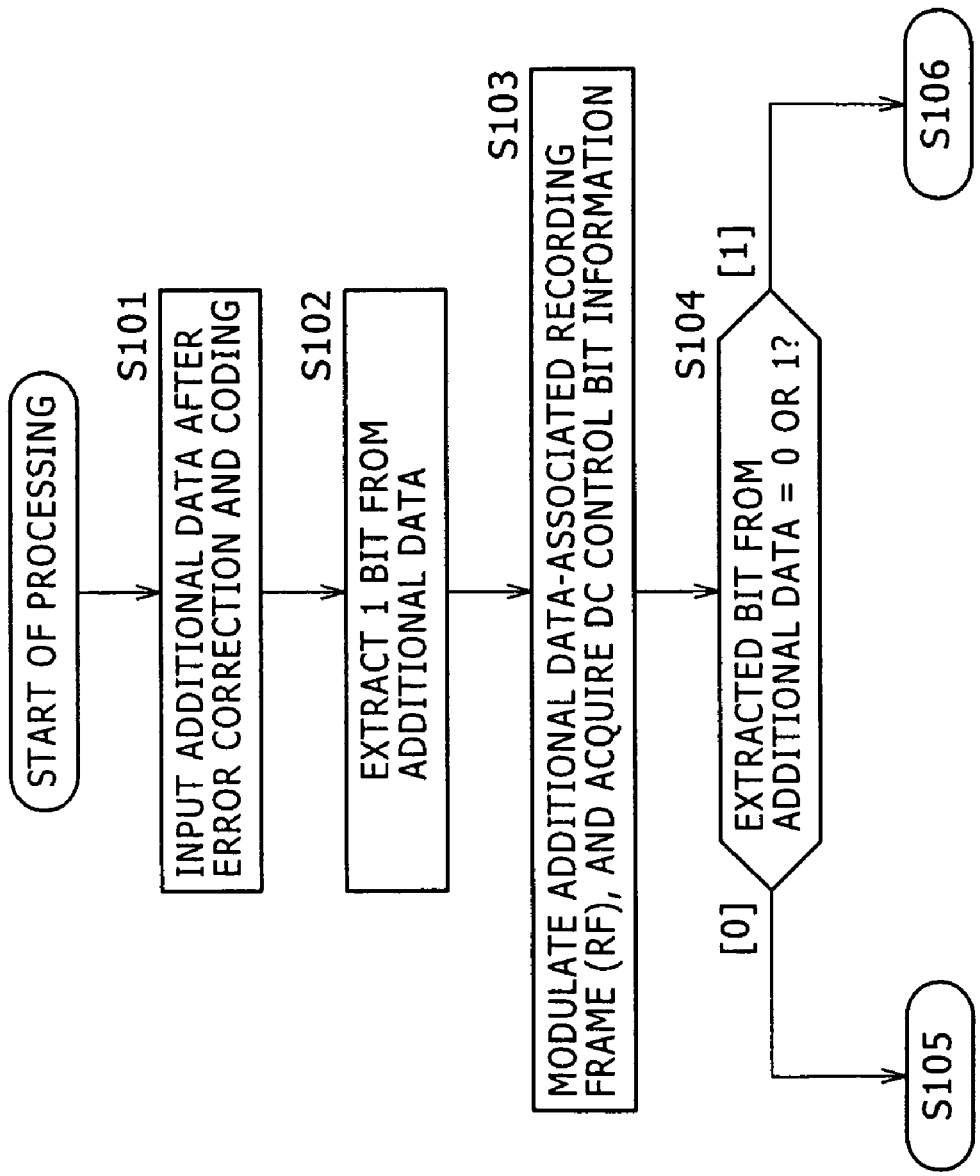

INFORMATION RECORDING DEVICE, INFORMATION REPRODUCING DEVICE, INFORMATION RECORDING MEDIUM, METHOD, AND COMPUTER PROGRAM

CROSS REFERENCE TO RELATED APPLICATIONS

The present application claims priority to Japanese Patent Document No. P2003-326112 filed on Sep. 18, 2003, the disclosure of which is herein incorporated by reference.

The present invention relates to an information recorder/processor, an information reproducer, an information recording medium, an information recording method, and a computer program for the same. More specifically, this invention relates to an information recorder/processor capable of recording in an information recording medium for recording therein contents such as video data and musical data, various types of additional information such as key information used for decoding various contents, contents reproduction control information, and copying control information with a format disabling analysis by setting DC (Digital Coding) control bit and also enabling reading the recorded information, an information reproducer, an information recording medium, an information recording method, and a computer program for the same.

When recording data such as musical data or video data as digital data in a recording medium, recording is performed according to a prespecified record format. For instance, error detection/correction code is added to original data to be recorded, and the data is coded to a format corresponding to a specific data recording/reproducing processing for recording.

Recently a system making it possible to record and reproduce information by using a blue laser as an information recording medium enabling high density information recording has been developed. In the information recording processing with the blue laser, basically demodulation is performed to demodulate 2-bit data to 3-bit data.

Contents to be stored in the information recording medium as described above include, for instance, moving pictures and musical data. The distribution rights of the contents such as musical data or video data are generally owned by the producers or distributors. Therefore, when distributing the contents, specific restrictions are applied to utilization of the data. In other words, utilization of the contents is generally allowed only to authorized users to inhibit unauthorized copies of the contents.

A large capacity recording medium such as a recording medium based on a blue laser recording system enabling high capacity recording can record therein data for one to several moving pictures in one recording medium. In association with the possibility of easily recording contents as digital information, the problem of illegal copies occurs everywhere, and the social problem of infringement of interests of copyright owners and distribution right owners has become serious. In the current situation as described above, prevention of illegal copies and protection of interests of copyright owners and distribution right owners are now extremely important problems.

To prevent illegal utilization of contents as described above, the configuration is proposed in which contents to be stored in an information recording medium is stored as encrypted contents and at the same time encryption key information configured to be used in utilization of the encrypted contents, information required for generation of an encryption key, or other various types of control information such as those used for reproduction and copying of contents are stored as secret information in the information recording medium. In this configuration, the reproduction processing program installed in a user's reproducer reads the secret information such as a key corresponding to contents to be reproduced, decodes the contents according to the read secret information as described above, or allows utilization of contents according to the reproduction control information.

As an example of the related technique for burying the secret information, for instance, Patent document 1 discloses the configuration in which specific data is buried by applying a connection bit (a margin bit) for EMF modulated data. Patent document 2 discloses the configuration in which a plurality of conversion tables are applied to modulation, data relating to the conversion tables applied to modulation is extracted in reproduction, and additional data is acquired based on the extracted data.

However, when the information indicating where the encryption key or control information is stored in an information recording medium is once acquired by a user or an illegal contents user, leakage or falsification of additional information disadvantageously becomes possible. For instance, there occur such problems as falsification of reproduction control information or copying control information or leakage of key information. Once the encryption key is leaked or the control information is falsified, utilization of contents based on authorized contents utilization right becomes completely impossible, which disables sufficient protection of copyright and utilization right for contents.

[Patent document 1] Japanese Patent Laid-open No. 2003-45128

[Patent document 2] Japanese Patent Laid-open No. 2002-367282

SUMMARY

The present invention was made in the light of the problems as described above, and it is a desire of the present invention to provide an information recorder/processor, an information reproducer, an information recording medium, an information recording method, and a computer program enabling recording of various types of additional information such as an encryption key stored with contents in a recording medium, an encryption key production information, contents reproduction control information, contents copying control information and other contents attribute information in an information recording medium with a format which can not be read in the general data read processing to prevent the recorded information from being illegally read out.

More specifically, it is a desire of the present invention to provide an information recorder/processor, an information reproducer, an information recording medium, an information recording method, and a computer program enabling recording of additional information with higher difficulty in deciphering by recording a DC control bit generally set in a recording frame as a data recording unit for DSV (Digital Sum Value) control as a bit value decided based on additional information such as an encryption key.

The present invention provides, in a first aspect thereof, an information recorder/processor including a modulated data producing section for producing a modulated recording frame as a recording unit data by setting a DC control bit to data to be recorded and executing modulation of the data, and a DC control bit specifying section for deciding a bit value set at a DC additional data-associated control bit position selected from a plurality of DC control bit setting positions included in an additional data-associated recording frame based on constituent bit information of the additional data, and the modulated data producing section sets a bit value of the additional data-associated DC control bit position in the additional data-associated recording frame in accordance with the instruction specified by the DC control bit specifying section.

In an information recorder/processor according to an embodiment of the present invention, the DC control bit specifying section sets a plurality of DC control bit positions included in the additional data-associated recording frame as additional data-associated DC control bit positions, and decides a plurality of bit values at a plurality of additional data-associated DC control bit positions based on the constituent bit information of the additional data.

In an information recorder/processor according to an embodiment of the present invention, the DC control bit specifying section decides one bit information selected from a plurality of different DC control information corresponding to one additional data constituent bit information as bit information to be set at the additional data-associated DC control bit position, and decides, when the bit information based on the DSV measurement set at the additional data-associated DC control bit position is identical to the DC control bit information associated to the additional data constituent bit information to be set, bit information different from that based on the DSV measurement as bit information set at the additional data-associated DC control bit position.

In an information recorder/processor according to an embodiment of the present invention, the DC control bit specifying section decides one bit information selected from a plurality of different DC control bit information corresponding to constituent bit information of one additional data as bit information to be set at the additional data-associated DC control bit position, and decides bit information with a smallest number of bits changed from the bit information based on the DSV measurement at the additional data-associated DC control bit position as bit information to be set at the additional data-associated DC control bit position.

Furthermore, in an information recorder/processor according to an embodiment of the present invention, the DC control bit specifying section decides different bit information as bit information to be set at the additional data-associated DC control bit position according to single constituent bit of 0 or 1 in the additional data.

In an information recorder/processor according to an embodiment of the present invention, the DC control bit specifying section decides different bit information as bit information to be set at the additional data-associated DC control bit position according to a plurality of constituent bit arrays in the additional data.

Furthermore, in an embodiment of the present invention, the information recorder/processor sets the additional data as constituent information for at least one of encryption key information, encryption key production information, contents reproduction control information, or contents copying control information for contents to be stored in the information recording medium.

In an information recorder/processor according to an embodiment of the present invention, the modulated data producing section executes data modulation satisfying RLL (1, 7) as the run length limited to produce a modulated recording frame.

In an information recorder/processor according to the present invention, the modulated data producing section executes modulated recording frame production including a step of converting 2-bit information to 3-bit information.

The present invention provides, in a second aspect, an information reproducer for executing reproduction of information stored in an information recording medium, and the information reproducer includes a data demodulating section for executing demodulation of data read out from the information recording medium; and an additional data decoding section for analyzing bit information set at an additional data-associated DC control bit position included in an additional data-associated recording frame and acquiring additional data constituent bit information based on a result of the analysis.

Furthermore, in an information reproducer according to an embodiment of the present invention, the additional data decoding section analyzes a plurality of DC control bits included in the additional data-associated recording frame, and acquires bit information previously associated to a bit array to be acquired as additional data constituent bit information according to a result of the analysis.

Furthermore, in an information reproducer according to an embodiment of the present invention, the additional data decoding section acquires a single constituent bit of 0 or 1 in the additional data based on bit information set at the additional data-associated DC control bit position set in one recording frame.

In an information reproducer according to an embodiment of the present invention, the additional data decoding section acquires a plurality of constituent bit information in the additional data based on bit information set at the additional data-associated DC control bit positions set in one recording frame.

Further in an embodiment of the present invention, the information reproducer produces at least one of encryption key information, encryption key production information, contents reproduction control information, or contents copying control information for contents to be stored in the information recording medium based on the acquired additional data constituent bit information.

The present invention provides, in a third aspect thereof, an information recording medium storing therein recorded data based on a recording frame with a DC control bit based on DSV control; and recorded data based on recording frames associated to additional data with a bit value decided based on constituent bit information of additional data set at a plurality of DC control bit positions.

In an information recording medium according to an embodiment of the present invention, the bit information stored at a plurality of additional data-associated DC control bit positions in a recording frame associated with the additional data is different from bit information based on the DSV measurement.

In an information recording medium according to an embodiment of the present invention, bit information associated to additional data set in one additional data-associated recording frame indicates a single constituent bit of 0 or 1 associated to additional data set in the additional data-associated recording frame.

Furthermore, in an information recording medium according to an embodiment of the present invention, bit information associated to additional data set in a recording frame associated to one additional data is information indicating a plurality of constituent bits in the additional data.

Furthermore, the information recording medium according to an embodiment of the present invention stores therein the additional data as constituent information for at least any one of encryption key information, encryption key production information, contents reproduction control information, and contents copying control information for contents to be stored in the information recording medium.

The information recording medium according to an embodiment of the present invention stores therein data based on modulated recording frame produced by executing data conversion satisfying RLL (1, 7) as the run length limited.

Furthermore the information recording medium according to an embodiment of the present invention records therein data based on a modulated recording frame produced by converting 2-bit information to 3-bit information.

The present invention provides, in a fourth aspect thereof, an information recording/processing method including the step of: deciding a bit value to be set at an additional data-associated DC control bit position selected from a plurality of DC control bit setting positions included in an additional data-associated recording frame based on constituent bit information for the additional data; and producing a modulated recording frame as a record unit by setting the bit value decided in the DC control bit specifying step at the additional data-associated DC control bit position included in the additional data-associated recording frame and executing data modulation.

In an information recording/processing method according to an embodiment of the present invention, a plurality of DC control bit positions included in the additional data-associated recording frame are set as DC control bit positions associated to the additional data in the DC control bit specifying step, and the method further includes a step of deciding a plurality of bit values of the additional data-associated DC control bit positions based on constituent bit information in the additional data.

An information recording/processing method according to an embodiment of the present invention, the DC control bit specifying step includes the step of deciding one bit information selected from a plurality of different DC control bit information associated to constituent bit information of additional data as bit information to be set at a DC control bit position associated to the additional data, and in this step, when the bit information based on DSV measurement at the additional data-associated DC control bit position is identical to the additional data-associated DC control bit information associated to additional data constituent bit information to be set, bit information different to the bit information based on the DSV measurement is decided as bit information to be set at the additional data-associated DC control bit position.

In an information recording/processing method according to an embodiment of the present invention, the DC control bit specifying step further includes the step of: deciding one bit information selected from a plurality of different DC control bit information associated to constituent bit information of one additional data as bit information to be set at the additional data-associated control bit position; and deciding bit information with a smallest number of bits changed from the bit information based on DSV measurement at the additional data-associated DC control bit position as bit information to be set at the additional data-associated DC control bit position.

In an information recording/processing method according to an embodiment of the present invention, different bit information is decided in the DC control bit specifying step as bit information to be set at the additional data-associated DC control bit position according to a single constituent bit of 0 or 1 in the additional data.

Furthermore, in an information recording/processing method according to an embodiment of the present invention, different bit information is decided as bit information to be set at the additional data-associated DC control bit position according to a plurality of additional data constituent bit arrays in the DC control bit specifying step.

The information recording/processing method according to an embodiment of the present invention further includes the step of setting the additional data as constituent information for at least any one of encryption key information, encryption key production information, contents reproduction control information, and contents copying control information for the contents to be stored in the information recording medium.

In an information recording/processing method according to an embodiment of the present invention, a modulated recording frame is produced by executing data modulation satisfying RLL (1, 7) as the run length limited in the modulated data producing step.

In an information recording/processing method according to an embodiment of the present invention, a modulated recording frame is produced by converting 2-bit information to 3-bit information in the modulated data producing step.

The present invention provides, in a fifth aspect thereof, an information reproducing method for executing reproduction of information stored in an information recording medium, and the method includes the step of: demodulating data read out from an information recording medium; and decoding an additional data by analyzing bit information at an additional data-associated DC control bit position included in the additional data-associated recording frame and acquiring additional data constituent bit information based on a result of the analysis.

In an information reproducing method according to the present invention, the additional data decoding step includes the step of analyzing a plurality of DC control bits included in the additional data-associated recording frame and acquiring bit information previously associated to a bit array to be acquired as additional data constituent bit information based on a result of the analysis.

Furthermore, in an information reproducing method according to the present invention, a single constituent bit of 0 or 1 in the additional data is acquired based on bit information set at the additional data-associated DC control bit position set in one recording frame in the additional data decoding step.

In an information reproducing method according to an embodiment of the present invention, a plurality of constituent bit information of the additional data is acquired based on bit information set at the additional data-associated DC control bit position set in one recording frame in the additional data decoding step.

The information reproducing method according to an embodiment of the present invention further includes the step of executing production of at least any of encryption key information, encryption key production information, contents reproduction control information, and contents copying control information for the contents to be stored in the information recording medium based on the acquired additional data constituent bit information.

The present invention provides, in a sixth aspect thereof, a computer program for executing processing for recording information, and the computer program includes the steps of: deciding a bit value to be set an additional data-associated DC control bit position selected from a plurality of DC control bit setting positions included in an additional data-associated recording frame based on constituent bit information for the additional data; and producing a modulated recording frame as a record unit by setting the bit value decided in the DC control bit specifying step at the additional data-associated DC control bit position in the additional data-associated recording frame and executing data modulation.

The present invention provides, in a seventh aspect thereof, a computer program for executing reproduction of information stored in an information recording medium, and the computer program includes the steps of demodulating data read out from an information recording medium; and decoding an additional data by analyzing setup bit information of additional data-associated DC control bit position included in an additional data-associated recording frame and acquiring additional data constituent bit information based on a result of the analysis.

The computer program according to the present invention is installed in a computer system capable of executing various types of program code, and can be provided in the state where the program is stored in a computer-readable recording medium (such as a CD, FD, or MO) or can be provided from a communication network. By providing the program in the computer-readable state, a program corresponding to each program is realized in the computer system.

Other and further objects, features, and advantages of the present invention will be clarified by referring to detailed descriptions of preferred embodiments of the present invention and to the appended drawings. The "system" as used herein logically indicates a collection of a plurality of devices, and the devices constituting the system are not always provided within a housing.

With the configuration according to the present invention, in a recorder/processor for recording additional data in a recording medium and processing various types of additional data such as key information, key production information, contents reproduction control information, copying control information applied to decoding of contents, bit values of a plurality of DC control bit information setting positions to be set in a recording frame associated to additional data is decided by constituent bit of the additional data, which is buried in an additional data burying area, and in the reproducer, the additional constituent bit information can be acquired by detecting the bit value at a specified DC control bit position in a recording frame associated to the additional data. With the configuration as described above, the configuration can be realized in which additional information such as key information, key production information, contents reproduction control information, and copying control information can be buried with a format substantially disabling analysis of the additional data, and also can accurately be read out in reproduction.

Additional features and advantages of the present invention are described in, and will be apparent from, the following Detailed Description and the Figures.

BRIEF DESCRIPTION OF THE FIGURES

FIG. 1 is a view illustrating configuration of an information recorder/processor according to the present invention;

FIG. 4 is a view illustrating details of data configuration in a conversion table applied to modulation processing in the information recorder/processor according to the present invention;

FIG. 9 is a view illustrating an example (1) of correspondence between constituent bits of additional data and DC control bits in the present invention;

FIG. 10 is a view illustrating an example (2) of correspondence between constituent bits of additional data and DC control bits in the present invention;

FIGS. 11(a) and 11(b) are views illustrating an example of processing for setting DC control bits based on additional data executed in the information recorder/processor according to the present invention;

FIGS. 12(a) and 12(b) are views illustrating another example of processing for setting DC control bits based on additional data executed in the information recorder/processor according to the present invention;

FIG. 13 is a flow chart (1) for illustrating a sequence of additional data recording processing executed in the information recorder/processor according to the present invention;

DETAILED DESCRIPTION

Figure 2A:
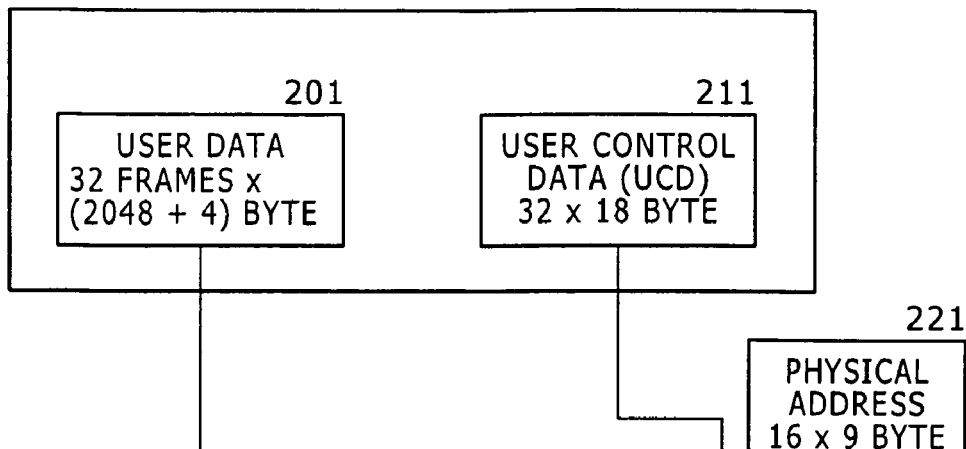
FIGS. 2(a) to 2(d) are views (1) illustrating details of processing in a modulated data producing section in the information recorder/processor according to the present invention.
Figure 2B:
Figure 2C:
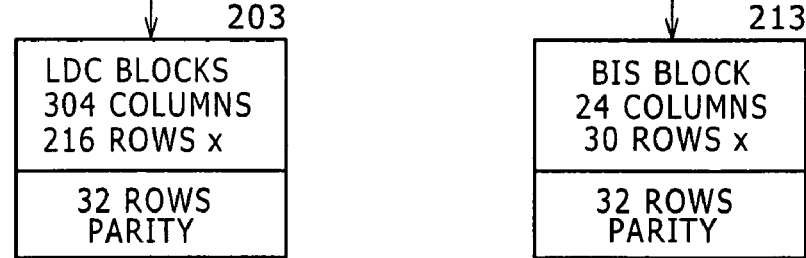

The information recorder/processor, the information reproducer, the information recording medium, the information recording method, and the computer program for the same according to the present invention are described below in detail with reference to the drawings.

At first, a configuration and processing of the information recorder/processor according to the present invention are described with reference to FIG. 1. The information recorder/processor described herein covers a mastering device as a manufacturing device for what is called a master disc, as well as a device including an information recording medium drive such as a DVD recorder/player and a PC usable for regular users. Namely, an information processor capable of writing data not only on a master disc but also on various recordable and rewritable information recording media is covered.

The configuration and processing of the information recorder/processor are described with reference to FIG. 1. The information recorder/processor includes an information recording medium 101 capable of recording data, a pick-up 102 for outputting a data-recording signal to the information recording medium 101, a spindle motor 103 for driving the information recording medium 101, a servo circuit 104 for controlling the pick-up 102 and the spindle motor 103, an additional data error correcting/coding section 105, a main data error correcting/coding section 106, an additional data recording area control section 107, a switch 108, a modulated data producing section 109, a DC control bit specifying unit 110, a record signal processing circuit 111, a DSV (Digital Sum Variation) measuring section 112, and a DSV-based DC control bit setting section.

A content data recorded on the information recording medium 101 is, for instance, a coded content data inputted in the main data error correcting/coding section 106 as a main data. The main data error correcting/coding section 106 executes a coding processing by producing and adding an error correcting code to the inputted data.

A modulating processing is then executed in the modulated data producing section 109. The information recorder/processor according to the present invention executes a modulation, for instance, based on the RLL (1, 7) modulating method on the basis of a modulation from 2-bit data to 3-bit data.

The modulation based on the RLL (1, 7) modulating method is a data converting method using a modulated data according to the RLL (1, 7) run length limited where the number of successive [0] is at least one and at most seven based on the modulated bit. This converting method uses a conversion table. A specific example of using the conversion table will be described later.

Based on the modulation data, a recording unit called a recording frame for which a synchronization signal is set up is produced and recorded in the information recording medium 101 via the record signal processing circuit 111.

During the modulating processing, a DC control bit inserting processing of selecting and inserting either [0] or [1] for a DC control bit is executed so that an absolute value of the DSV (Digital Sum Variation) becomes smaller to execute the modulating processing for the data frame inserted with the DC control bit.

The DSV is an index for the DC balance of an NRZI conversion signal produced as a record signal for the information recording medium. More specifically, assuming that a value accumulated with the bit [0] in a recording bit series (NRZI conversion signal) regarded as [−1] and the bit [1] as [+1] is DSV, either [0] or [1] for a DC control bit is selected and inserted so as to minimize a deviation of the DSV from 0, and then the modulating processing is executed. The NRZI processing will be described later in detail.

However, with the present invention, for the recording area (recording frame) of an additional data such as an encryption key, the DC control bit is not partially selected based on the DSV for the bit set-up but a value selected based on a constituent bit of the additional data is set as a DC control bit. This processing will be described later.

A modulated data producing processing executed in the modulated data producing section 109 is described in detail with reference to FIGS. 2(a) to 2(d) and FIGS. 3(d) and 3(h).

The recorded data includes, as shown in FIG. 2(a), a user data 201 and a user control data (UCD) 211. The user data 201 includes an entity data of a reproduced data such as a content data, and the user control data 211 includes various control data such as reproduction controlling information and copy-controlling information.

The user data 201 is set based on a unit of 32 frames each of which includes 2048-byte data and 4-byte parity. The user control data 211 is configured with 32 units of 18-byte data.

A data block 202 is formed based on the user data 201 with 32 frames×(2048+4). The data block 202 has an array of 304 columns×216 rows. A unit of 1 column×1 row stores 1 byte (8 bits) data.

For the data block 202, an LDC block 203 is produced as a data block with 32-row parity added to each column, and an interleaving processing to the LDC block 203 produces an LDC cluster 204 with 152 columns×496 rows.

In the meantime, after the user control data 211 is combined with a physical address data 221 with 16×9 bytes to produce an access block 212 with 24 columns×30 rows, a BIS block 213 is produced as a data block with 32-row parity added to each column for the access block 212, and an interleaving processing to the BIS block 213 produces a BIS cluster 214 with 3 columns×496 rows.

Figure 2D:
Figure 3D:
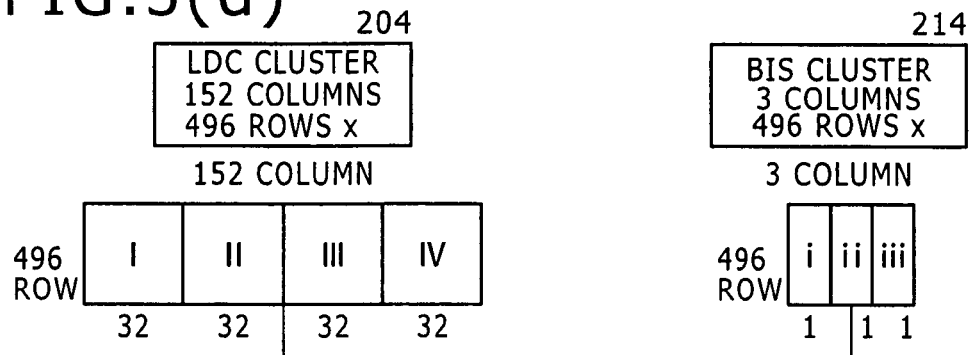
FIGS. 3(d) to 3(h) are views (2) illustrating details of processing in a modulated data producing section in the information recorder/processor according to the present invention.

FIG. 3(d) shows a data similar to FIG. 2(d), namely the LDC cluster 204 with 152 columns×496 rows produced based on the user data 201 and the BIS cluster 214 with 3 columns× 496 rows produced based on the user control data 211.

Figure 3E:
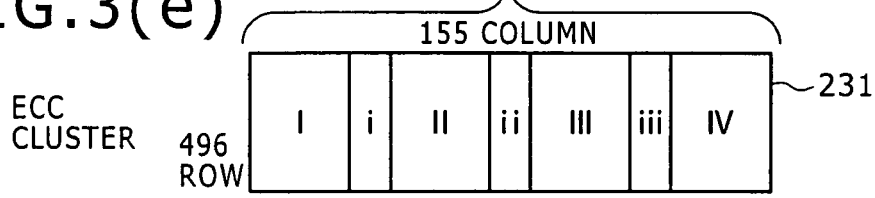

The LDC cluster 204 with 152 columns×496 rows is, as shown in FIG. 3(d), divided into four parts (I to IV) based on the unit of 32 columns, the BIS cluster 214 with 3 columns× 496 rows is divided into three parts (i to iii) based on the unit of 1 column, and each parts of these clusters are combined alternately to produce an ECC cluster 231 with 155 columns× 496 rows as shown in FIG. 3(e).

Figure 3F:
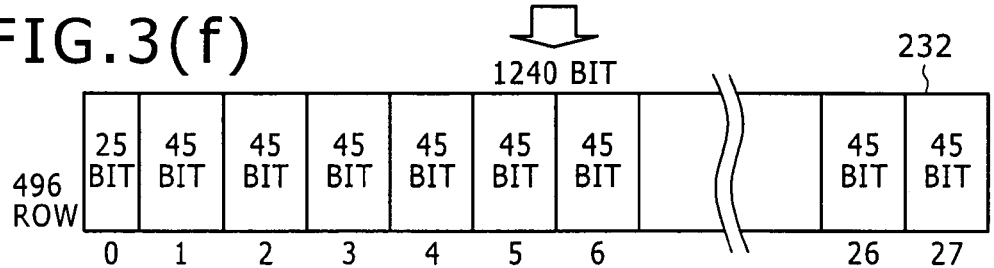

Further, the ECC cluster 231 is set as a cluster 232 divided into 28 parts denoted by reference numerals 0 to 27 in FIG. 3(f). Only part 0 has 25 bits, and all the other parts have 45 bits each. The bit rate shown in FIG. 3(f) means a bit rate per row.

Figure 3G:
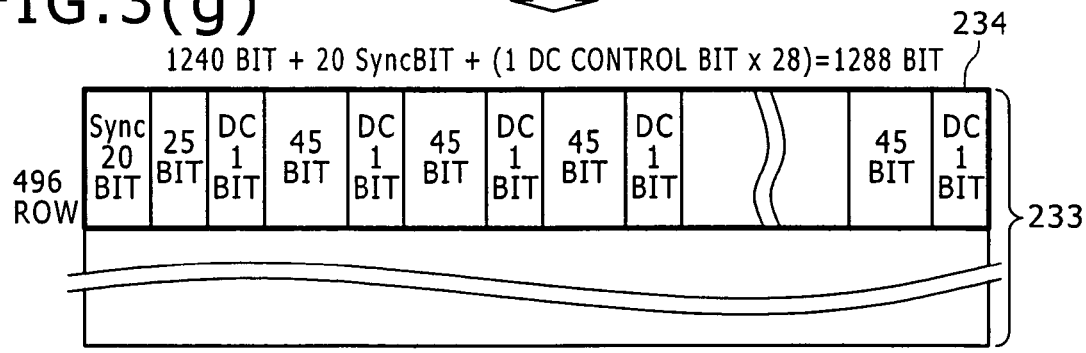
Figure 3H:
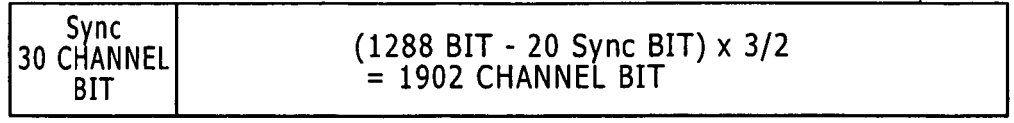

Furthermore, as shown in FIG. 3(g), a Sync bit with 20 bits is set, and a DC control bit with 1 bit is set between each of parts 0 to 27 in FIG. 3(f).

As a result of this, a physical cluster 233 with [1240+20 (Sync)+(1 DC control×28)=1288]×496 rows is set. Each row in the physical cluster 233 is assumed to be a recording frame 234 as a unit of modulated data producing processing.

The DC control bit is an index for a DC balance of the NRZI conversion signal produced as a record signal for the information recording medium. More specifically, assuming that a value accumulated with the bit [0] in a recording bit series (NRZI conversion signal) regarded as [−1] and the bit [1] as [+1] is DSV, either [0] or [1] for the DC control bit is selected and inserted so as to minimize the deviation of the DSV from 0.

However, as described above, with the present invention, for the recording area of the additional data, the DC control bit is not selected according to the rule described above for the bit set-up, but either [0] or [1] for the DC control bit is selected and inserted based on the constituent bit of the additional data is set as a DC control bit. This processing will be described later.

Returning to FIG. 3(d) to 3(h), the explanation of the modulated data producing processing continues. To the recording frame 234 with 1288-bit data, a modulating processing to convert 2-bit data into 3-bit data is executed. In the data conversion, data conversion using a modulated data according to the RLL (1, 7) run length limited where the number of successive [0] is at least one and at most seven is executed to produce a modulation recording frame 235.

The modulation recording frame 235 is configured with 30 channel bits of Sync channel bit as the modulated data bit and (1288−20 sync bit)×2/3=1902 channel bit, totaling 1932-channel bit.

A conversion table is used for the data converting processing from 2-bit data to 3-bit data according to the RLL (1, 7) run length limited. A specific example of the conversion table is shown in FIG. 4.

As shown in FIG. 4, the conversion table is configured as a table correlating the modulated data bits with each input bit. For instance, when the input data is [00000000], the modulated data bit is [010100100100]. When the input data is [11], the modulated data bit is [000] if the preceding modulated data bit is [xx1], or [101] if the preceding modulated data bit is [xx0].

The modulated data bit according to the RLL (1, 7) run length limited is produced by executing the data conversion from 2-bit data to 3-bit data according to the table.

Returning to FIG. 1, the explanation of the configuration and processing of the information recorder/processor according to the present invention continues. The modulated data producing processing described with reference to FIGS. 2(a) to 2(d) to FIG. 4 is executed in the modulated data producing section 109 in FIG. 1, and the record signal based on the produced modulated data is produced in the record signal processing circuit 111.

The record signal processing circuit 111 produces an NRZI (Non Return to Zero Inverted) signal for inverting the plus and minus of a pulse according to the value [0] or [1] of the modulated data produced by the modulated data producing section 109, and records the same on the information recording medium 101 as a record signal.

Figure 5:
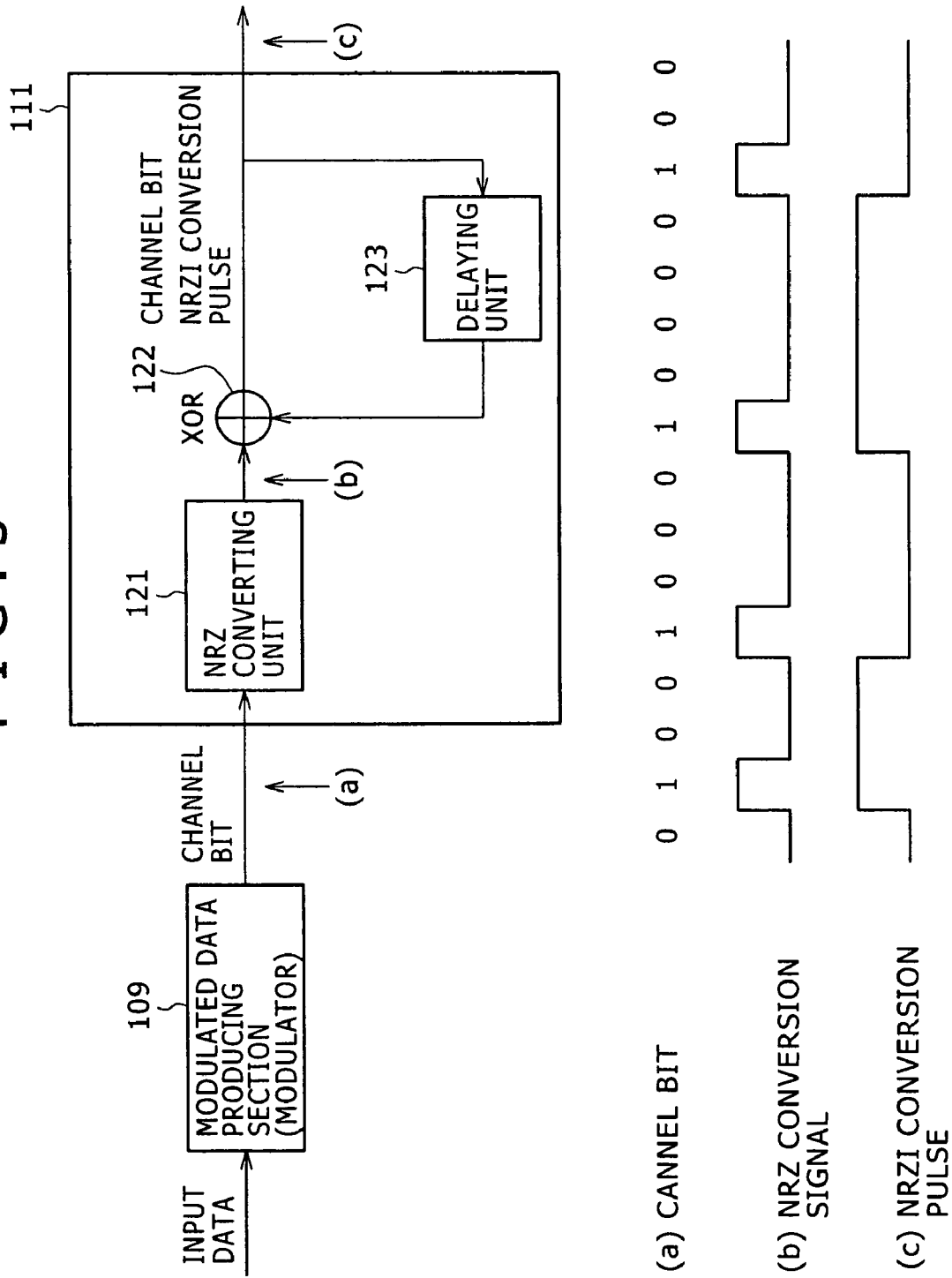
FIG. 5 is a view illustrating processing executed in a record signal processing circuit in the information recorder/processor according to the present invention.

A configuration of the NRZI production as a record signal executed by the record signal processing circuit 111 is described with reference to FIG. 5. The channel bit as a modulated data bit outputted from the modulated data producing section 109 is inputted to the record signal processing circuit 111 including an NRZ converting unit 121, an exclusive OR (XOR) 122, and a Delaying unit 123. In FIG. 5, (a) denotes the channel bit, (b) denotes the output signal from the NRZ converting unit 121, and (c) denotes an NRZI converted pulse being a record signal as the final output from the record signal processing circuit 111. The record signal is outputted by the pick-up 102, and the record information under the control of the servo circuit section 104.

With the configuration according to the present invention, whether the DC control bit (see FIG. 3(g)) executed by the modulated data producing section 109 is set to [0] or [1] in the case of the recording frame equivalent to the recording area for the additional data is determined partially based on the constituent bit of the additional data.

For instance, a specific recording frame is selected as an additional data recording area, a certain DC control bit in the selected recording frame, for instance, a DC control bit where three DC control bits at positions a, b, and c in the 28 DC control bits set as a recording frame is determined based on the constituent bit of the additional data, is used, and the bit value [0] or [1] is determined based on the constituent bit of the additional data for the specific DC control bits. This processing allows for recording the additional data on the modulated data.

Returning to the configuration in FIG. 1, the explanation of the configuration of the information recorder/processor according to the present invention continues. In FIG. 1, the additional data is inputted to the additional data error correcting/coding section 105, and a coding processing for adding an error correcting code is executed. The additional data herein refers to the data configured with various information such as encryption key information, encryption key production information, contents reproduction control information, contents copying control information, and other contents attribute information.

The DC control bit specifying unit 110 inputs a bit string of the additional data added to the error correcting code from the additional data error correcting/coding section 105. For instance, a data string of [0, 0, 0, 1, 0, 0, 0 . . . ] is inputted. The bit string includes any of the additional data including encryption key information, encryption key production information, contents reproduction control information, contents copying control information, and other contents attribute information as well as the error correcting code for the additional data.

The additional data recording area control section 107 detects a set-up area for the additional information bit based on the output data from the main data error correcting/coding section 106. Namely, a produced data area for a specific recording frame as a set-up area for the additional information bit is detected.

When the produced data area for a specific recording frame as a set-up area for the additional information bit is detected, the additional data recording area control section 107 sets the switch 108 on the side of the DC control bit specifying unit 110 and outputs the DC control bit information determined by the DC control bit specifying unit 110 based on the additional information to the modulated data producing section 109.

The modulated data producing section 109 determines and set a value of the DC control bit added to the recording frame corresponding to the additional data recording area based on an instruction from the DC control bit specifying unit 110.

The DC control bit specifying unit 110 inputs a bit string of the additional data added with an error correcting code, for instance, a bit string such as [0, 0, 0, 1, 0, 0, 0 . . . ] from the additional data error correcting/coding section 105, and determines the value of the DC control bit in a specific position in the recording frame as a set-up area for the additional information bit according to each bit value [0] or [1].

For the processing procedure, for instance, no matter for the recording frame as the set-up area for the additional information bit or the normal recording frame except for the set-up area for the additional information bit, the bit value determined based on the DSV is set as the DC control bit as in the past. Namely, assuming that a value accumulated with the bit [0] in a recording bit series (NRZI conversion signal) regarded as [−1] and the bit [1] as [+1] is DSV, either [0] or [1] for a DC control bit is selected and inserted so as to minimize the deviation of the DSV from 0.

In FIG. 1, the DSV measuring section 112 executes DSV measurement for each recording frame, the result of the measurement is inputted to the DSV-based DC control bit setting section 113, and the DSV-based DC control bit setting section 113 executes the DC control bit set-up processing based on the DSV, namely, sets the bit value capable of further reducing the deviation of the DSV from 0 as the value of the DC control bit.

After the set-up of the DC control bit based on the DSV, a replacing processing of the bit values is performed only on the DC control bit in the specific position in the recording frame as a set-up area for the additional information bit.

The bit value determined based on the additional data is outputted to the modulated data producing section 109 via the switch 108 by the DC control bit specifying unit 110, and only the DC control bit in the specific position associated to the additional data is replaced with the value instructed by the DC control bit specifying unit 110. For other positions, the values set by the DSV-based DC control bit setting section 113 are maintained. The switching control for the switch 108 is executed by the additional data recording area control section 107 and outputs the output from the DC control bit specifying unit 110 to the modulated data producing section 109 only when the processing of the additional data-associated DC control bit adjustment recording frame is executed.

FIG. 1 is a block diagram schematically illustrating configuration of and processing by the information recorder/processor according to the present invention, and the actual processing for setting a DC control bit based on the determination as to which of a bit associated to additional data or a bit based on a result of DVS measurement is executed by a control section such as a CPU executing a program describing a processing sequence for setting a DC control bit. Therefore, in the information recorder/processor, hardware corresponding to discrete components such as a switch shown in FIG. 1 and the like is not always indispensable. The recording frame can be executed on hardware enabling production of a recording frame including a control section for executing processing following a specified program, a CPU as a data processing section, and a memory such as a storage unit for storing therein data, parameters, and the like.

The processes executed in such blocks as the error correcting/coding section, the DC control bit specifying unit, and modulated data producing sections shown in FIG. 1 is executed on the hardware including a control section for executing processing following a specified program, a CPU as a data processing section, and a memory such as a storage unit for storing therein data, parameters, and the like, and in FIG. 1, each block corresponds to a single function for facilitating understanding of the present invention.

Details of the processing for setting a DC control bit associated to additional data executed by the DC control bit specifying unit 110 shown in FIG. 1 are described below.

Figure 6:
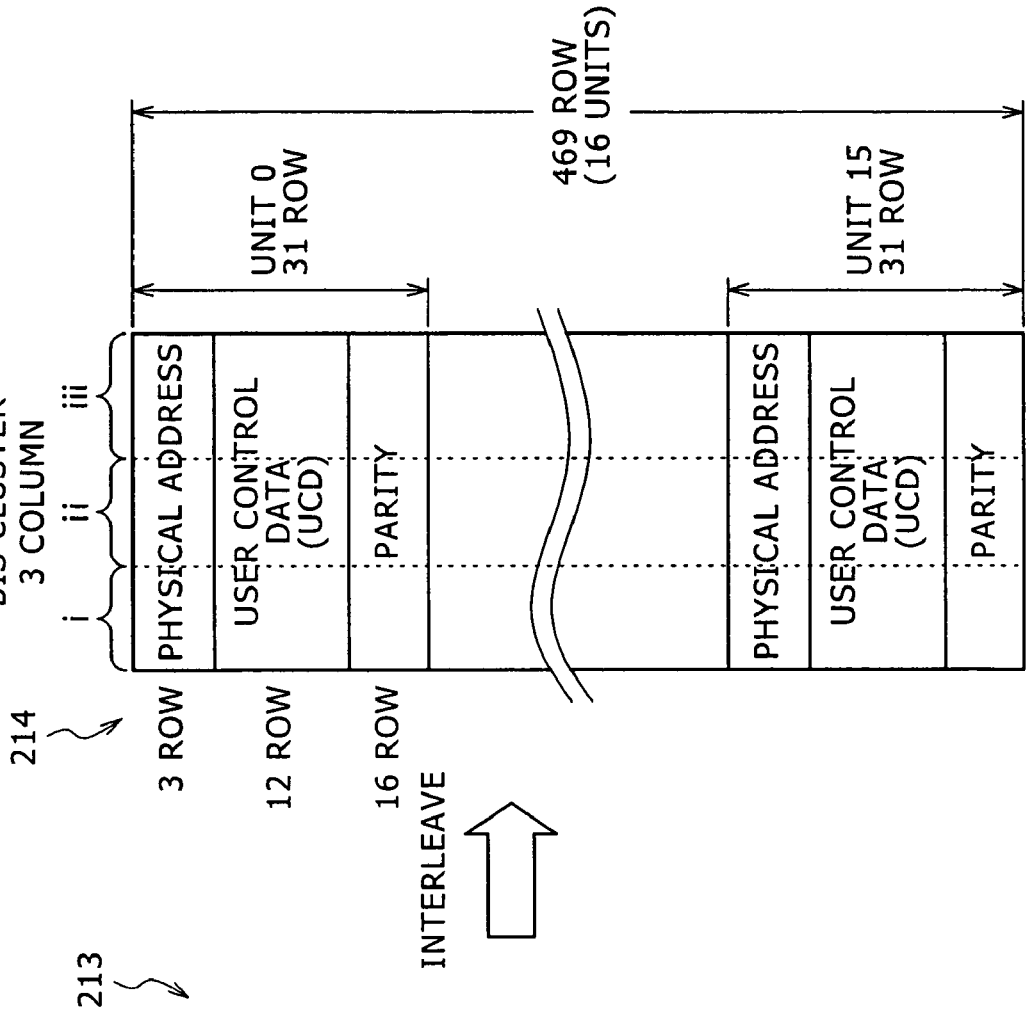
FIGS. 6(A) and 6(B) are views illustrating detailed configuration of a BIS block and a BIS cluster.

FIGS. 6(A) and 6(B) are views illustrating details of the BIS block 213 and BIS cluster 214 produced based on the user control data 211 during the modulated data producing processing described by referring to FIGS. 2(a) to 2(d) and FIGS. 3(d) to 3(h).

As described by referring to FIGS. 2(a) to 2(d) and FIGS. 3(d) to 3(h), the user control data (UCD) 211 is associated with the 16×9 bytes physical address data 212, and after the access block 212 with the size of 24 columns×30 rows is produced, the BIS block 213 is produced as a data block with a parity of 32 columns added thereto as described in FIG. 6(A) for the access block 212.

The BIS cluster 214 with the size of 3 columns×496 rows as shown in FIG. 6(B) is produced by the interleaving to the BIS block 213.

As shown in FIG. 6(B), the BIS cluster includes one unit formed with a physical address extending over 3 rows, user control data (UCD) extending over 12 rows, and a parity extending over 16 rows, and the unit has the size of 3 columns×31 rows. The BIS cluster 214 has the size of 3 columns×496 rows and include units 0 to 15, namely 16 units in all.

Figure 7:
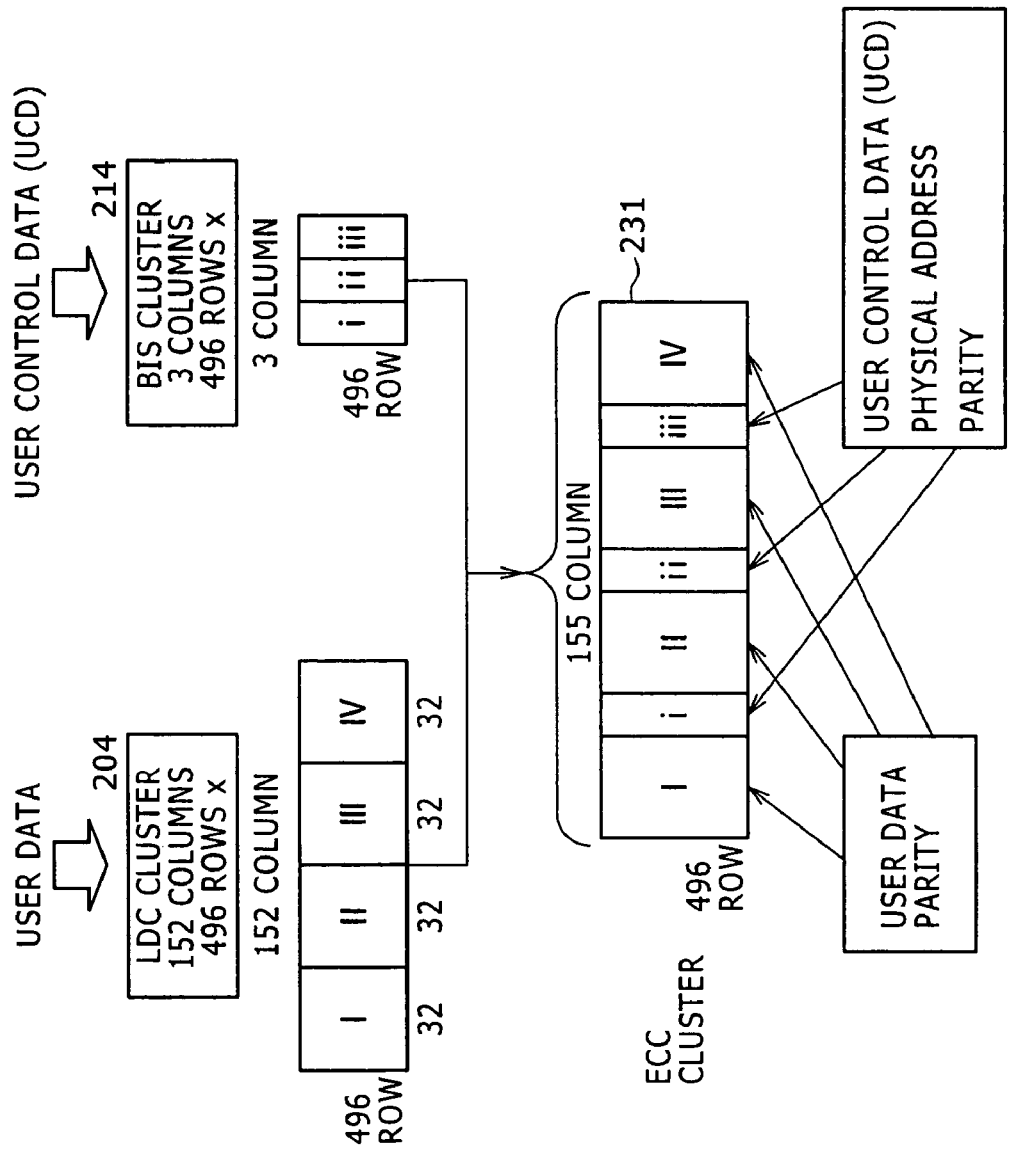
FIG. 7 is a view illustrating an ECC cluster set based on an LDC cluster and a BIS cluster.

As shown in FIG. 7, the BIS cluster having the configuration as described with reference to FIGS. 2(a) to 2(d) and FIGS. 3(d) to 3(h) is inserted line by line between quarter data I to VI of the LDC cluster 204 set based on user data such as contents, thus the ECC cluster 231 being produced.

As shown in FIG. 7, the ECC cluster is set by combining the LCD cluster having the size of 152 columns and 496 rows with the BIS cluster having the size of 3 columns×496 rows.

As described by referring to FIGS. 6(A) and 6(B), the BIS cluster has a physical address, user control data (UCD), and a parity, which are arranged in different rows respectively. Therefore the BIS cluster (i, ii, iii) included in each of the 496 rows constituting the ECC cluster 231 denotes any of the physical address, user control data (UCD), and parity.

Figure 8:
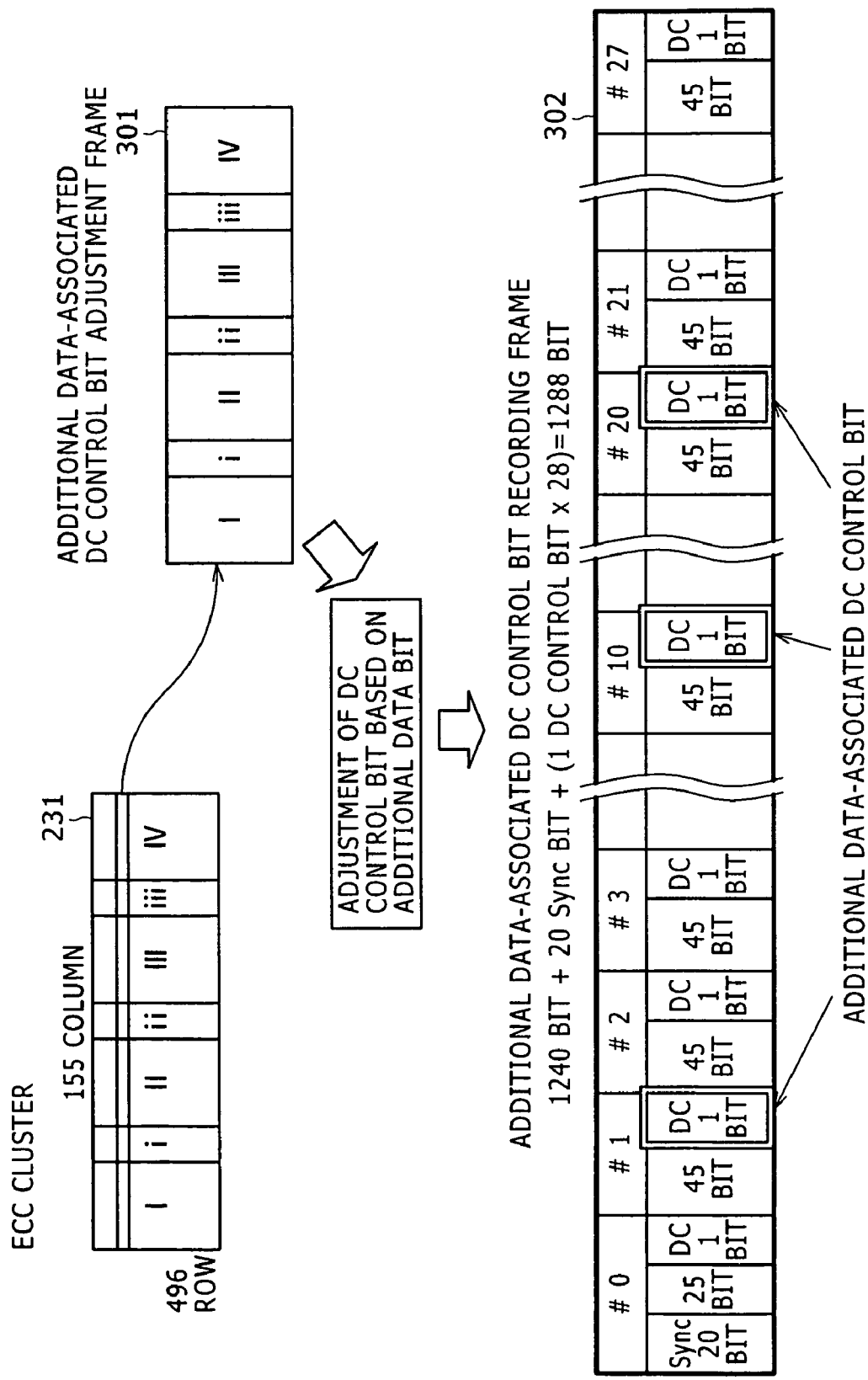
FIG. 8 is a view illustrating an ECC cluster, a DC control bit adjustment frame associated to additional data, and a DC control bit adjustment recording frame associated to the additional data.

AS shown in FIG. 8, a particular row selected from the 496 rows constituting the ECC cluster 231 is set as an additional data-associated DC control bit adjustment frame 301.

A portion of a DC control bit set in the additional data-associated DC control bit adjustment frame 301 is set as a DC control bit having a bit value decided by the additional data constituent bit. In the DC control bit adjustment recording frame 302 shown in FIG. 8, the DC control bit corresponding to constituent bit for additional data is set at each of the control bit positions #1, #10, and #20 in the recording frame.

As shown in FIG. 8, a recording frame is divided into 28 sections #0 to #27, and 1-bit DC control bit of [0] or [1] is set in each sections. The DC control bit at a specified position among the 28 positions for setting a DC control bit is set as a DC control bit associated to the additional data.

As described above, a DC control bit is set, as a rule, as a bit value decided based on DSV. In other words, generally [0] or [1] is selected and inserted as a DC control bit so that the difference between DSV and zero will be minimized assuming bit [0] in the recording bit series (NRZI conversion signal) as [−1] and bit [1] as [+1]. In this case DSV indicates a sum of the bits.

However, as for the DC control bit corresponding to an additional data constituent bit (DC control bit at each of the positions #1, #10, #20 in the recording frame 302 shown in FIG. 8), the rule described above is not employed, and a value decided based on the additional data constituent bit value is set.

In FIG. 8, a DC control bit associated to additional data constituent bit is provided at each of the three positions #1, #10, and #20 in the DC control bit adjustment recording frame 302, and a DC control bit at a position other than the three positions described above is set as a DC control bit decided based on the DSV measurement. However, a value decided based on the additional data constituent bit value is set for each of these three bits.

In the example described above, each of the positions #1, #10, and #20 in the DC control bit adjustment recording frame is employed as a position for setting a DC control bit based on additional data, but a position for setting an additional data-associated DC control bit is not limited to the three positions #1, #10, and #20, and a DC control position can be set at any position.

A number of positions each for setting a DC control bit is not limited to three, and a bit based on additional data can be set at any number of positions in the DC control bit adjustment recording frame. An information reproducer for decoding additional data decodes the additional data by executing the processing for decoding the additional data based on the information concerning prespecified positions each for setting a DC control bit associated to additional data.

Correspondence between the three positions, at each of which a bit based on additional data is set, within the DC control bit adjustment recording frame and [0] or [1] as an additional data constituent bit is, for instance, as shown in FIG. 9.

In the example shown in FIG. 9, when the three bits in the DC control bit adjustment recording frame has the same parity of [0, 0, 0] or [1, 1, 1], the additional data constituent bit is set to [0], and when the three bits in the DC control bit adjustment recording frame are different, namely when the set of three bits is any of [0, 0, 1], the additional data constituent bit is set to [1].

In the example shown in FIG. 9, the additional data constituent bit is set to [0] or [1] according to the three bits in the DC control bit adjustment recording frame, but the present invention is not limited to this configuration, and various configurations are possible including that shown in FIG. 10 in which the two additional data constituent bits are set to [0, 0], [0, 1], [1, 0], and [1, 1] according to a set of three bits in the DC control bit adjustment recording frame.

In either one of the configurations shown in FIG. 9 and FIG. 10, a plurality of DC control bit information are associated to one additional data bit information. In other words, in FIG. 9, two sets of DC control bits of [0, 0, 0] and [1, 1, 1] are associated to one additional data constituent bit of [0], and six sets of control bits, namely [0, 0, 1] to [1, 0, 1] are associated to one additional data constituent bit of [1]. Also in the example shown in FIG. 10, two sets of DC controls bits of [0, 0, 0] and [1, 1, 1] are associated to one set of additional data constituent bits [0, 0], and any of other sets of additional data constituent bits of [0, 1], [1, 0], and [1, 1] is associated to a plurality of (two) sets of DC control bits.

With this configuration, in setting a DC control bit based on a result of DSV measurement, when the same DC control bit as that based on additional data constituent bit is set, the set value can be replaced with another value different from the DC control bit based on DSV measurement. Because the replacement as described above is possible, when it is tried to copy data, it is possible to decide whether the copying operation is legal or not.

For instance, in the processing based on the setup shown in FIG. 9, in the case where the three bits in the DC control bit adjustment recording frame for storing therein additional data constituent bit [0] (for instance, at the positions #1, #10, and #20) is [0, 0, 0] when DC control bits are set based on DSV measurement, the DC control bit information set to the additional data bit of [0] is changed to a different value, so that a set of [1, 1, 1] is obtained. With this processing, when data is copied, whether the data is copied or not can easily be determined.

For instance, in the case where the three bits in the DC control bit adjustment recording frame for storing therein additional data constituent bit are [0, 0, 0] when DC control bits based on DSV measurement are set, by replacing the control bits with [1, 1, 1] and then recording the data, in a case where a recording medium with the recorded data based on the recording frame recorded therein is set on an information reproducer and the data is demodulated, reproduced, and re-recorded in another recording medium, namely when the data is copied, and when the processing for additional DC control bits based on the DSV measurement is newly executed, the DC control bits of [0, 0, 0] are set at the additional data-associated DC control bit positions, and the control bits are different from the original DC control bits of [1, 1, 1]. Therefore, the fact that copied data is recorded in the recording medium can easily be detected.

To make it possible to determine whether data is copied or not, a plurality of DC control bit information is assigned to bit information associated to one additional data.

Details of the processing for storing additional data according to the present invention are described below with reference to FIGS. 11(a) and 11(b), and FIGS. 12(a) and 12(b). FIGS. 11(a) and 11(b), and FIGS. 12(a) and 12(b) are views each showing an example like that shown in FIG. 9, namely an example in which DC control bits at three positions #1, #10, and #20 in the additional data-associated DC control bit adjustment recording frame are selected, and 1-bit additional data constituent bit of [0] or [1] is associated according to the three DC control bits.

FIGS. 11(a) and 11(b) are views illustrating the processing for adjusting DC control bits in the additional data-associated recording frame when the additional data constituent bit is [0].

FIG. 11(a) illustrates a case where DC control bits of [0, 1, 0] are set at three additional data-associated DC control bit setting positions (for instance, #1, #10, and #20) based on DSV measurement.

As shown in FIG. 11(a), the DC control bits of [0, 1, 0] decided based on DSV measurement are set at the additional data-associated DC control bit setting positions (#1, #10, and #20) within the recording frame 321.

Because the constituent bit of the additional data is [0], it is necessary to set any of [0, 0, 0] or [1, 1, 1] at the additional data-associated DC control bit setting positions based on the table shown in FIG. 9. In this example, the DC control bits set based on DSV measurement are [0, 1, 0], and therefore [0, 0, 0] requiring change of only one bit is selected for the DC control bits for the additional data, and the DC control bit at the position #10 is changed from [1] to [0], thus the additional data-associated DC control bit adjustment recording frame 322 as shown in the middle stage in FIG. 11(a) being produced. The DC control bits can be changed to [1, 1, 1], but a number of changed bits should be minimized to reduce influence over DSV.

Then conversion of 2-bit data to 3-bit data is performed according to the RLL (1, 7) run length limited to produce the modulated recording frame 323 with Sync code set therein.

This processing is executed by the modulated data producing section 109 shown in FIG. 1, and the recording frame 321 with DSV control bits based on DSV measurement has the configuration as shown in FIG. 1 and includes therein DC control bits decided by the DSV base DC control bit setting section 113 based on DSV measurement by the DSV measuring section 112.

As described with reference to FIG. 8, a 1-bit DC control bit is set in each of the 28 sections #0 to #27 of a recording frame. FIGS. 11(a) and 11(b) show only three DC control bit values at the additional data-associated DC control bit positions (#1, #10, and #20), and DC control bits based on DSC measurement information are stored at other DC control bit positions.

Only the three DC control bits at the additional data-associated DC control bit positions (#1, #10, and #20) are objects for replacement with another value. In the DC control bit specifying unit 110 shown in FIG. 1, values of three additional data-associated DC control bits are decided based on additional data, and this decided bit information is inputted to the modulated data producing section 109, and three DC control bits at the additional data-associated DC control bit positions (#1, #10, and #20) are replaced with different values respectively.

In the modulated data producing section 109 shown in FIG. 1, the processing for replacement of bit values is executed for the DC control bits at the three additional data-associated DC control bit positions (#1, #10, and #20) based on input information from the DC control bit specifying section 110. With the processing, the recording frame 322 with the DC control bits of [0, 0, 0] based on additional data set therein is produced.

Then conversion of 2-bit information to 3-bit information is performed according to the RLL (1, 7) run length limited to produce the modulated recording frame 323 with Sync code set therein.

The modulated recording frame 323 produced in the modulated data producing section 109 is converted to an NRZI signal (Refer to FIG. 5) in the recording signal processing circuit 111 shown in FIG. 1, and is recorded in the information recording medium 101.

AS a result of processing shown in FIG. 11(a), three DC control bits of [0, 0, 0] are set at the three additional data-associated DC control bit positions (#1, #10, and #20) in the additional data-associated recording frame.

In the reproducer for reproducing data, information concerning the three DC control bits at the three additional data-associated DC control bit positions (#1, #10, #20) in the additional data-associated recording frame are detected. As a result of detection, three bits of [0, 0, 0] are detected as DC control bit information, and it is determined on this 3-bit information that a bit value in the additional data is [0].

The reproducer acquires additional data constituent bit values for a plurality of additional data-associated recording frames to acquire n-bit additional data such as an encryption key based on a plurality of analyzed bit values.

The reproducer for reproducing data stores the correspondence table shown in FIG. 9 or FIG. 10 in a storage section, or a program for executing an algorithm for interpreting additional data associated to the correspondence table in the storage section, and also determines the additional data bit values based on the additional data-associated DC control bits by referring to the correspondence table or according to the program for executing the algorithm for interpreting the additional data. The processing for detecting additional data in the reproducer is described in detail below.

FIG. 11 (b) illustrates processing in a case where, although a constituent bit of additional data is [0] like in FIG. 11(a), DC control bits of [0, 0, 0] based on DSV measurement are set at three DC control bit setting positions (for instance, #1, #10, and #20) for setting DC control bit associated to additional data.

As shown in FIG. 11(b), the DC control bits of [0, 0, 0] based on DSV measurement are set at additional data-associated DC control bit setting position in the recording frame 331.

As the constituent bit of additional data is [0], it is necessary to set any of [0, 0, 0] or [1, 1, 1] at the additional data-associated DC control bit setting positions based on the table shown in FIG. 9. In this example, the DC control bits set based on DSV measurement are [0, 0, 0], so that the DC control bit values corresponding to the constituent bit [0] of the additional data has already been set.

In this case, as described above, to enable determination as to whether data is copied or not, the processing is performed to replace the bit information with different DC control bit information corresponding to the constituent bit of [0] in the additional data. In this case, the DC control bit information is changed to [1, 1, 1] corresponding to the constituent bit [0] in the additional data.

As shown in FIG. 11(b), all of the DC control bits associated to the additional data at the positions #1, #10, and #20 are changed from [0] to [1] to produce the additional data-associated DC control bit adjustment recording frame 332.

Then conversion of 2-bit information to 3-bit information is executed according to the RLL (1, 7) run length limited to produce a demodulated recording frame 333 with Sync code set therein.

This processing is executed by the demodulated data producing section 109 shown in FIG. 1. The demodulated recording frame 333 generated in the modulated data producing section 109 is converted to an NRZI signal (Refer to FIG. 5) in the record signal processing circuit 111 as shown in FIG. 1 and is recorded in the information recording medium 101.

As a result of processing shown in FIG. 11(b), the three DC control bits of [1, 1, 1] are set at the additional data-associated DC control bit positions (#1, #10, and #20) in the additional data-associated recording frame.

The reproducer for reproducing data detects the three DC control bit information of [1, 1, 1] at the additional data-associated DC control bit positions (#1, #10, and #20) in the additional data-associated recording frame, and determines that the bit value of the additional data is [0] based on the 3-bit information.

FIGS. 12(a) and 12(b) are views illustrating the processing for adjusting DC control bits in the additional data-associated recording frame when a constituent bit of the additional data is [1].

FIG. 12(a) is an example of process executed when DC control bits of [0, 0, 0] based on DSV measurement are set at three DC control bit setting positions (for instance, #1, #10, and #20) each for setting a DC control bits associated to additional data.

As shown in FIG. 12(a), in the recording frame 341, the DC control bits of [0, 0, 0] based on DSV measurement are set at the additional data-associated DC control bit setting positions.

Because a constituent bit of the additional data is [1], it is necessary to set any of [0, 0, 1] to [1, 0, 1] based on the table shown in FIG. 9 at the additional data-associated DC control bit setting positions. In this example, the DC control bits set based on DSV measurement are [0, 0, 0], so that [0, 1, 0] requiring change of only one bit is selected as the DC control bits for the additional data, and the DC control bit (at position #20) is changed from [0] to [1] to produce the additional data-associated DC control bit adjustment recording frame 342 as shown in the middle of FIG. 12(a). Any other one among [0, 0, 1] to [1, 0, 1] can be set. To minimize influence over DSV, it is preferable to select and execute the processing requiring minimum change of bits.

Then, conversion of 2-bit information to 3-bit information is performed according to the RLL (1, 7) run length limited for modulation to produce a modulated recording frame 343 with Sync code set therein.

This processing is executed by the modulated data producing section 109 shown in FIG. 1. The modulated recording frame 343 produced in the modulated data producing section 109 is converted to an NRZI signal (Refer to FIG. 5) in the recording signal processing circuit 111 shown in FIG. 1 and is recorded in the information recording medium 101.

Because a result of the processing shown in FIG. 12(a), DC control bits of [0, 0, 1] are set at the three DC control bit setting positions (for instance, #1, #10, and #20) each for setting a DC control bits associated to additional data in the additional data-associated recording frame.

The reproducer for reproducing data detects the three DC control bit information at the additional data-associated DC control bit setting positions (for instance, #1, #10, and #20) in the additional data-associated recording frame, and detects the three DC control bits of [0, 0, 1] as a result of the detection. The reproducer determines based on this 3-bit information that a bit value data of the additional data is [1].

FIG. 12(b) illustrates an example of processing in a case where, although a constituent bit of additional data is [1] like in FIG. 12(a), DC control bits of [0, 1, 0] based on DSV measurement are set at the three DC control bit setting positions (for instance, #1, #10, and #20) each for setting a DC control bit associated to the additional data.

As shown in FIG. 12(b), DC control bits of [0, 1, 0] based on DSV measurement are set at the additional data-associated DC control bit setting positions in the recording frame 351.

Because a constituent bit of the additional data is [1], it is necessary to set any of [0, 0, 1] to [1, 0, 1] based on the table shown in FIG. 9 at the additional data-associated DC control bit setting positions. In this example, the DC control bits set based on DSV measurement are [0, 1, 0], so that the DC control bit values corresponding to the constituent bit [1] of the additional data have been set.

As described above, to determined whether the data is copied or not, the processing for replacing the DC control bit information with different DC control bit information corresponding to the constituent bit [1] of the additional data is executed. For instance, [0, 1, 1] requiring change of only one bit is selected as the DC control bits associated to the additional data; so that the DC control bit at the position #10 is changed from [0] to [1] to produce an additional data-associated DC control bit adjustment recording frame 352 as shown in the middle of FIG. 12(b). Of the DC control bits [0, 0, 1] to [1, 0, 1], any pattern other than [0, 1, 0] may be set. However, to minimize influence over DSV, it is preferable to execute the processing requiring minimum change of bits.

Then conversion of 2-bit information to 3-bit information is executed for modulation according to the RLL (1, 7) run length limited to produce a modulated recording frame 353 with Sync code set therein.

This processing is performed by the modulated data producing section 109 shown in FIG. 1. The modulated recording frame 353 produced in the modulated data producing section 109 is converted to an NRZI signal (Refer to FIG. 5) by the record signal processing circuit 111 shown in FIG. 1, and is recorded in the information recording medium 101.

As a result of the processing shown in FIG. 12(b), DC control bits of [0, 1, 1] are set at the three additional data-associated DC control bit setting positions (for instance, #1, #10, and #20) in the additional data-associated recording frame.

The reproducer for reproducing data detects the three DC control bits at the three DC control bit setting positions (for instance, #1, #10, and #20) in the additional data-associated recording frame, and detects the three DC control bits of [0, 1, 1] as a result of detection. The reproducer determines based on the 3-bit information that a bit value of the additional data is [1].

A processing sequence of recording additional data executed by the information recorder/processor according to the present invention is described with reference to FIG. 13 and FIG. 14.

Additional data having been subjected to error correction/coding is inputted in step S101. This data is outputted from the additional data error correcting/coding section 105 shown in FIG. 1. The additional data includes various types of information such as encryption key information, encryption key production information, contents reproduction control information, contents copying control information, and other contents attribute information, and a bit array including additional data with error correction code added thereto such as [0, 0, 0, 1, 0, 0, 0 . . . ] is inputted.

In step S102, recording bits are acquired one by one from the constituent bit arrays of the additional data such as, for instance, [0, 0, 0, 1, 0, 0, 0 . . . ] sequentially. In this processing flow, the processing is executed bit by bit for the constituent bits of additional data, but as described with reference to FIG. 10, in the configuration in which DC control bit information is associated to each of 2-bit additional data bits [00] to [11], the additional data bits are processed two bits by two bits, and two bits are sequentially extracted for processing from an array of additional data such as, for instance, [0, 0, 0, 1, 0, 0, 0 . . . ]. An example of processing additional data constituent bits one by one is described below.

In step S103, the processing for modulating an additional data-associated recording frame (RF) is executed, and DC control bit information set based on DSV measurement is acquired. The DC control bit information acquired in this step indicates bit information at DC control bit positions associated to additional data in the additional data-associated recording frame (RF). As described above, for instance, when DC control bits associated to additional data are set at the positions #1, #10, and #20 in the recording frame, information on the DC control bit at the positions #1, #10, and #20 is acquired.

In step S104, determination is made as to whether record bits, namely bit values sequentially extracted from a bit array of additional data such as [0, 0, 0, 1, 0, 0, 0 . . . ] are [0] or not respectively.

When the extracted bit is [0], processing moves to step S105. When the extracted bit is [1], the processing moves to step S106.

Figure 14:
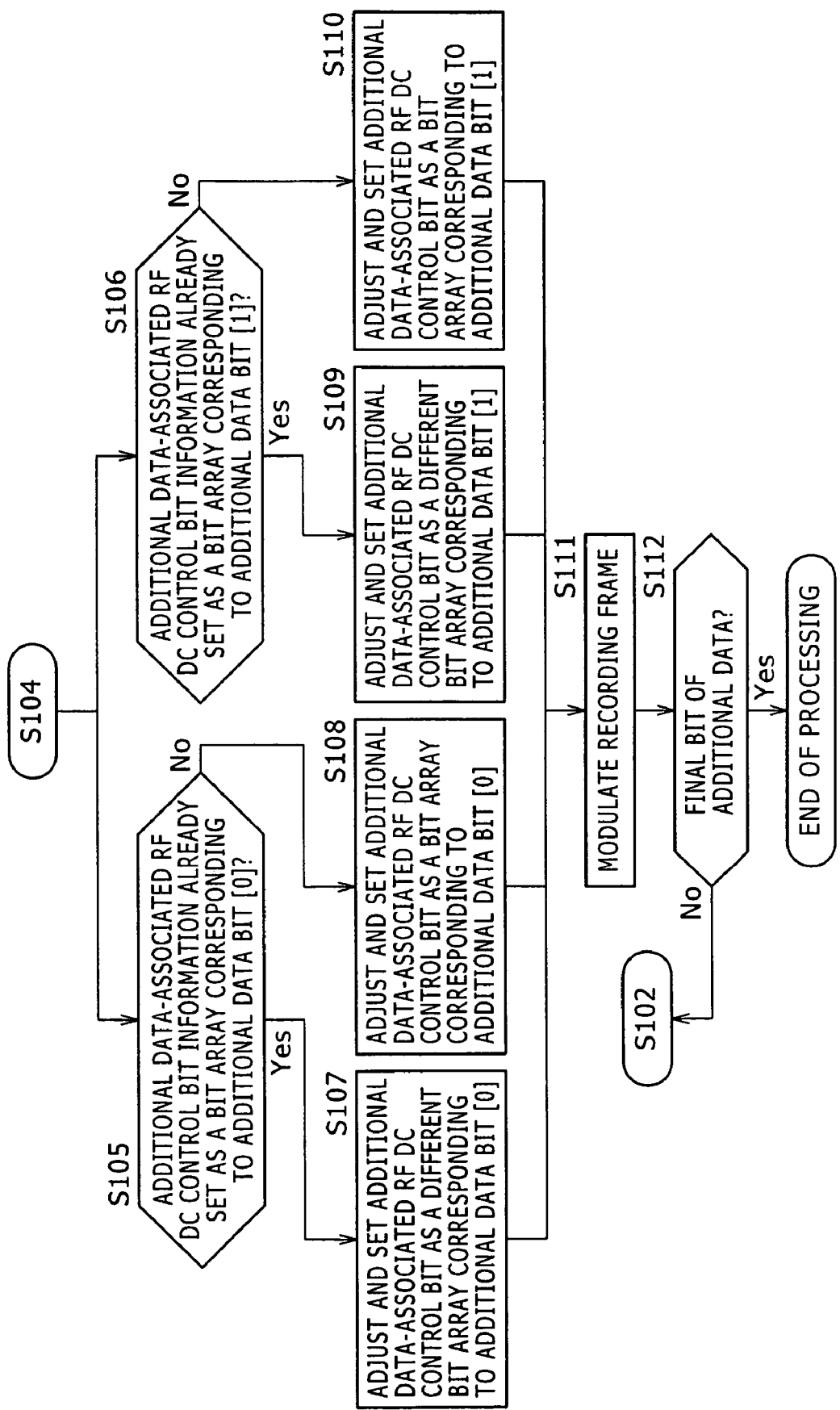
FIG. 14 is a flow chart (2) for illustrating a sequence of additional data recording processing executed in the information recorder/processor according to the present invention.

When the record bit is [0], in step S105 shown in FIG. 14, determination is made as to whether the DC control bit information acquired in step S103, namely bit information at the additional data-associated DC control bit positions in the additional data-associated recording frame (RF) is set as a bit array corresponding to the additional data [0] or not.

More specifically, when the processing based on the correspondence, for instance, shown in FIG. 9 is executed, determination is made as to whether [0, 0, 0] or [1, 1, 1] are set at the additional data-associated DC control bit positions as DC control bits based on DSV measurement or not.

When a bit array corresponding to the additional data bit [0] is set as DC control bits based on DSV measurement (Yes in step S105), the processing moves to step S107, and a bit array corresponding to the additional data bit [0] already set is replaced with a different bit array corresponding to the additional data bit [0].

More specifically, when [0, 0, 0] are set as DC control bits based on DSV measurement, the processing for replacing [0, 0, 0] with [1, 1, 1] is executed. When [1, 1, 1] is set as DC control bits based on DSV measurement, the processing for replacing [1, 1, 1] with [0, 0, 0] is executed.

When it is determined No in step S105, namely that a bit array corresponding to the additional data bit [0] is not set as a DC control bit based on DSV measurement, the processing moves to step S108, the processing is performed for replacing the bit array with another bit array corresponding to the additional data bit [0]. More specifically, the processing is performed for replacing bit values at the additional data-associated DC control bit setting positions with a bit array of [0, 0, 0] or [1, 1, 1] corresponding to the additional data bit [0].

On the other hand, when the record bit is [1], in step S106 shown in FIG. 14, determination is made as to whether the DC control bit information acquired in step S103, namely the bit information at additional data-associated DC control bit positions in the additional data-associated recording frame (RF) is set as a bit array corresponding to the additional data bit [1] or not.

More specifically, when the processing based on the correspondence, for instance, shown in FIG. 9 is executed, determination is made as to whether any of [0, 0, 1] to [1, 0, 1] is set as DC control bits based on DSV measurement at the additional data-associated DC control bit setting positions or not.

When a bit array corresponding to the additional data bit [1] is set as a DC control bit based on DSV measurement (Yes in step S106), the processing moves to S109, and a bit array corresponding to the additional data bit [1] already set is replaced with a different bit array corresponding to the additional data bit [1].

More specifically, for instance, when [0, 0, 1] is set as DC control bits based on DSV measurement, the DC control bits of [0, 0, 1] is replaced with any of different bit arrays corresponding to the additional data constituent bit [1], namely with any of [0, 1, 0], [1, 0, 0], [0, 1, 1], [1, 1, 0], and [1, 0, 1].

When a result of determination in step S106 is No, namely when a bit array corresponding to the additional data bit [1] is not set as DC control bits based on DSV measurement, the processing flows to step S110, and the DC control bits is replaced with a bit array corresponding to the additional data bit [1]. More specifically, bit values at the additional data-associated DC control bit setting positions are replaced with any of bit arrays [0, 0, 1] to [1, 0, 1] corresponding to the additional data bit [1] shown in FIG. 9.

In step S111, the additional data-associated recording frame with DC control bits controlled according to the additional data set therein is modulated. The processing for modulation is executed in the modulated data producing section 109 shown in FIG. 1.

In step S112, whether the processing of a final bit of the additional data has been finished or not is determined, and when there is data not processed yet, the processing steps beginning with step S102 are repeated.

When it is determined in step S112 that there is no data not processed yet, it indicates completion of the processing described above, and recorded data with additional information bit inserted therein is produced according to the processing sequence as described above.

As described above, the processing flows shown in FIG. 13 and FIG. 14 are examples in which additional data is processed bit by bit, and when it is determined that the correspondence between the additional data bits based on a 2-bit unit and the DC control bit information has been set as shown in FIG. 10, the processing is executed by two bits. Alternatively also the configuration is possible in which the correspondence between 3 bits or more in additional data and DC control bit information or correspondence between any number of bits in the additional data and any number of DC control bits is set, and processing is performed according to the correspondence set up as described above.

Configuration of the data reproducer for reproducing data from an information recording medium with the additional information as described above contents (main data) such as moving pictures or music as described above recorded therein and a sequence of reproduction processing are described below.

Figure 15:
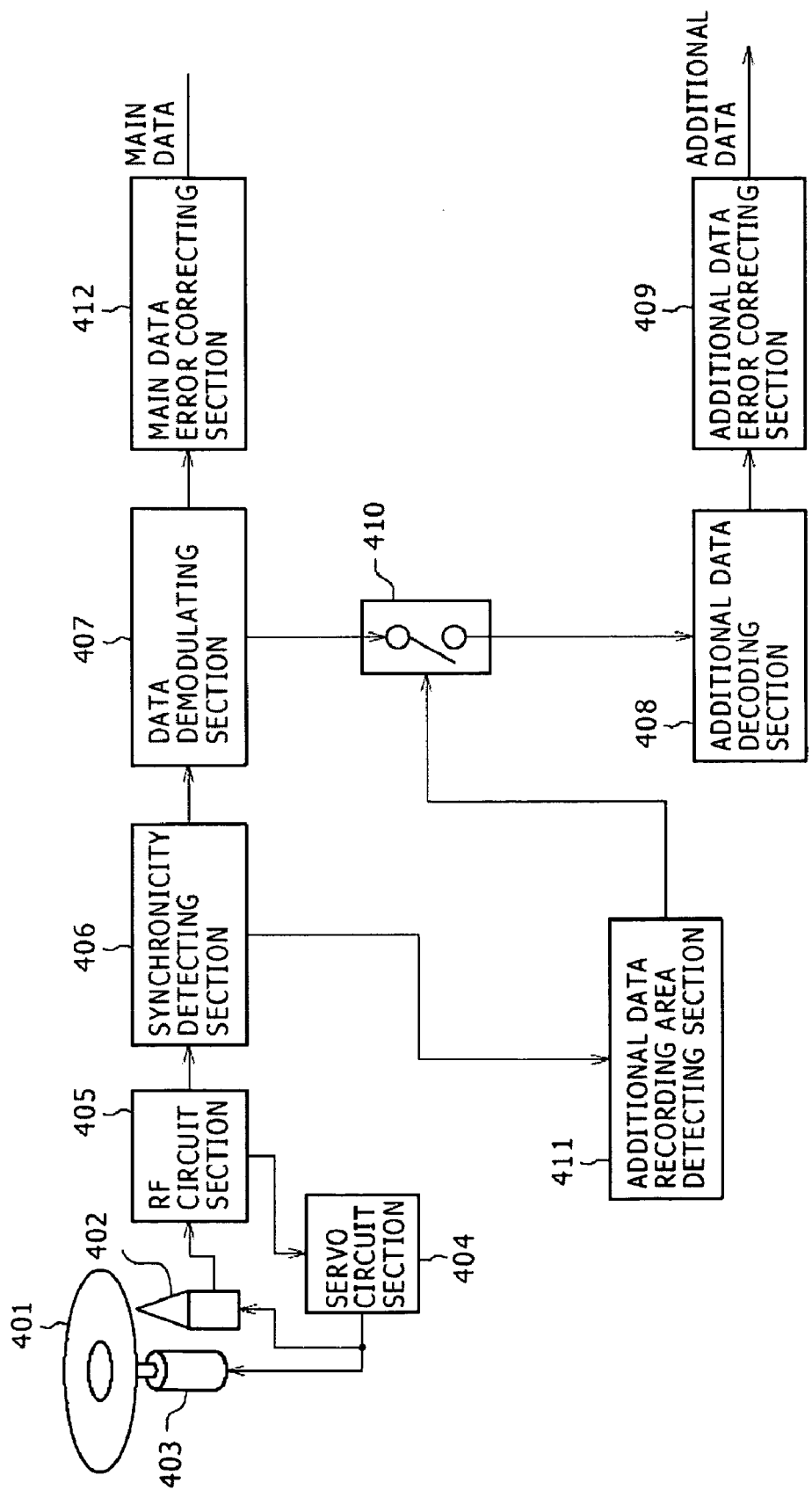
FIG. 15 is a view illustrating an information reproducer according to the present invention.

Configuration of the data reproducer and processing for reproducing data are described above with reference to FIG. 15. The data reproducer includes an information recording medium 401, a pick-up 402 for reading out data from the information recording medium 401, a spindle motor 403 for driving the information recording medium 401, a servo circuit section 404 for controlling the pick-up 402 and spindle motor 403, an RF circuit section 405 for producing an RF signal by executing signal processing such as gain adjustment for a read signal, a synchronicity detecting section 406 for extracting a sync signal from the RF signal, a data demodulating section 407 for demodulating data, a switch 410 for outputting a read signal only from the information recording medium to an additional data decoding section 408, an additional data recording area detecting section 411 for detecting an additional data area and controlling the switch 410, an additional data decoding section 408 for decoding additional data, a main data error correcting section 412 for correcting an error in main data, and an additional data error correcting section 409 for correcting an error in the additional data.

The contents data stored in the information recording medium 401 is, for instance, encrypted contents data, and additional data stored in the information recording medium 401 include key data used for decoding encrypted contents, key production information, contents reproduction control information, contents copying control information, and other contents attribute information.

The data read via the pick-up 402 from the information recording medium 401 is subjected to signal processing such as gain adjustment in the RF circuit section 405, and is inputted to the synchronicity detecting section 406. The synchronicity detecting section 406 detects a sync signal in a record signal, and outputs the detected signal to the additional data recording area control section 411.

The additional data recording area control section 411 determines a recording area of additional data based on the sync signal inputted from the synchronicity detecting section 406, and controls the switch 410 based on determination information. With this switch control, a recording frame in an area required for decoding additional data, namely a recording frame associated to the additional data with DC control bit information based on the additional data set therein are inputted to the additional data decoding section 408 for decoding additional data from the data demodulating section 407.

The additional data decoding section 408 executes decoding for acquisition of additional data based on the additional data-associated recording frame inputted from the data demodulating section 407. Namely the additional data decoding section 408 detects the DC control bit information based on additional data from the additional data-associated recording frame and determines constituent bit of additional data based on the detected DC control bit value.

In other words, the additional data decoding section 408 acquires values of DC control bits, for instance, at the additional data-associated DC control bit setting positions #1, #10, and #20 in the additional data-associated recording frame, and determines whether the constituent bit of additional data is [0] or [1] based on the information described above.

The additional data decoding section 408 has a storage section having a correspondence table shown in FIG. 9 or FIG. 10, or executes processing according to a program for executing an algorithm for interpreting the additional data corresponding to the correspondence table. Namely the additional data decoding section 408 executes the processing for determining an additional data bit value based on DC control bits associated to additional data by referring to the correspondence table stored in the storage section or according to the algorithm for interpreting additional data.

When the data processed in the data demodulating section 407 is a recording frame associated to additional data, the reproducer inputs the frame data via the switch 410 to the additional data decoding section 408, and the additional data decoding section 408 acquires DC control bits at additional data-associated DC control bit setting positions in the additional data-associated recording frame, and determines constituent bits in the additional data based on the information.

The additional data decoding section 408 executes the processing described above based on the recording frame with additional data inputted intermittently set therein, and acquires additional data such as, for instance, n-bit information key data, key production information, contents reproduction control information, contents copying control information, and other attribute information of the contents. The additional data includes error correction code as described in relation to the data recorder/producer and is outputted after error correction in the additional data error correcting section 409.

When the additional data is, for instance, key information used for decoding contents, the additional data is outputted to the decoding section for decoding the contents. When the additional data is contents reproduction control information, the data is outputted to the reproduction control section.

In a case of the general data other than additional data, data read out from an information recording medium is outputted from the sync detecting section 406 to the data demodulating section 407 and is sequentially subjected to data conversion described by referring to FIGS. 2(a) to 2(d) and FIGS. 3(d) to 3(h) above, and then the reproduced data is acquired.

Also main data, which is demodulated data, includes an error correction code like that in the additional data, and is outputted after the error is corrected in the main data error correcting section 412.

When the output data is, for instance, encrypted contents, the data is decoded by using an encryption key that can be produced based on the key produced information outputted as additional data, and then is outputted via an output unit such as a display or a speaker.

Figure 16:
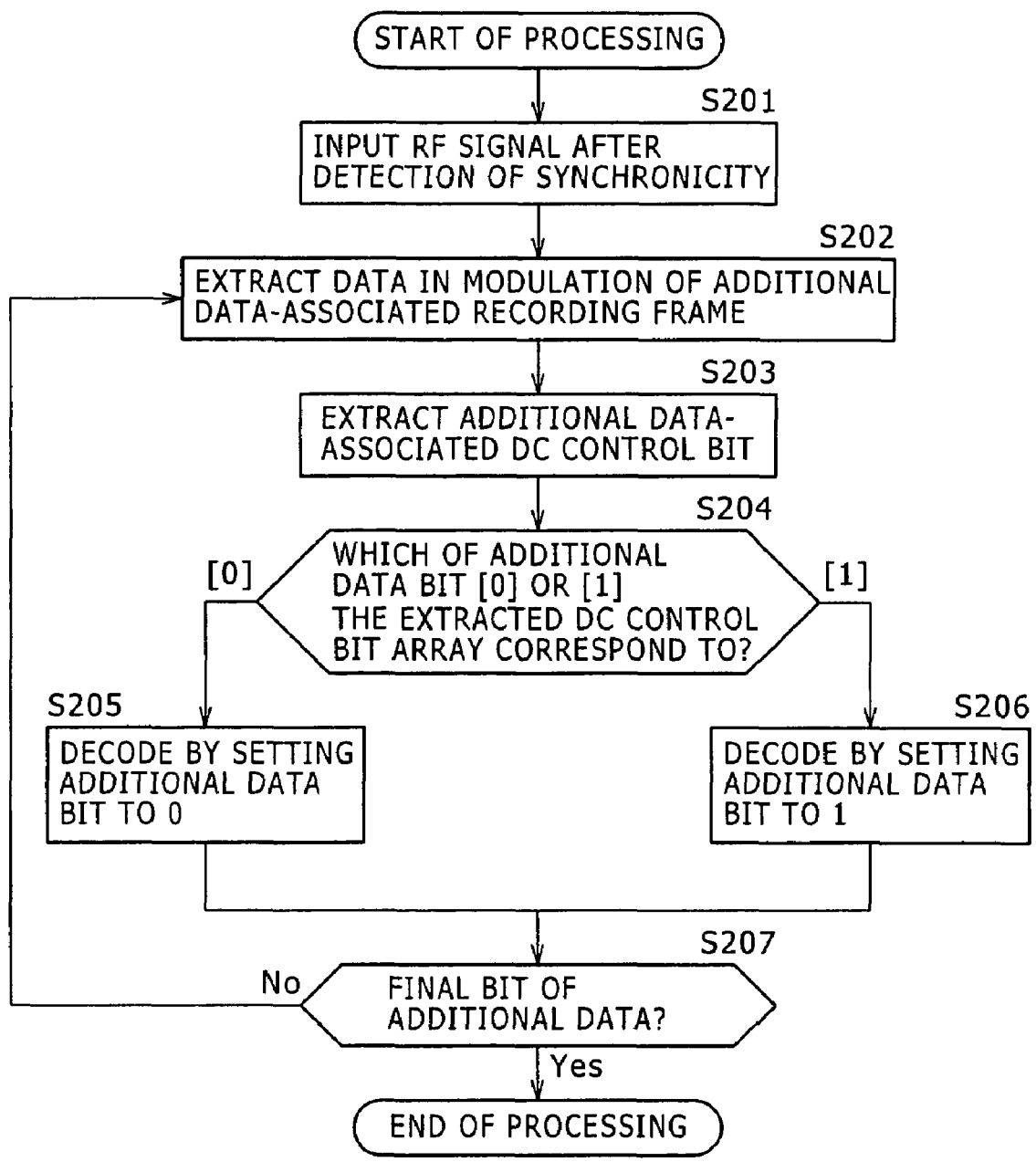
FIG. 16 is a flow chart for illustrating a sequence of additional data recording processing executed in the information reproducer according to the present invention.

A sequence of reproduction including a step of reading out additional information is described below with reference to FIG. 16. The processing shown in FIG. 16 is executed by the reproducer shown in FIG. 15.

In step S201, an RF signal is produced based on a signal read out from the information recording medium. In step S202, demodulation is carried out based on the RF signal, and a recording frame associated to additional frame, namely a recording frame having DC control bit values decided based on the additional data is acquired as data in the process of demodulation. The acquired additional data-associated recording frame is inputted from the data demodulating section 407 shown in FIG. 15 to the additional data decoding section 408.

In step S203, the additional data decoding section 408 executes the decoding processing for acquiring additional data based on the additional data-associated recording frame inputted from the data demodulating section 407. In other words, DC control bit information based on the additional data is extracted from the additional data-associated recording frame. For instance, values of DC control bits, for instance, at the positions #1, #10, and #20 are acquired.

In step S204, determination is made as to which of the additional data bit [0] and [1] the DC control bit array corresponds to. As described above, the additional data decoding section 408 determines additional data bit values by executing the correspondence table shown in FIG. 9 or FIG. 10, or the algorithm for interpreting additional data associated to the corresponding table to determine the bit values based on the additional data-associated DC control bits.

When it is determined in step S204 that the acquired values of DC control bits correspond to the additional data bit of [0], it is determined in step S205 that the additional data bit is [0]. When it is determined in step S204 that the acquired DC control bit values correspond to the additional data bit of [1], it is determined in step S206 that the additional data bit is [1].

In step S207, whether the bit is a final bit of the additional data or not is determined. When it is determined that there is still any bit not processed, the processing steps beginning with step S202 are repeated until a final bit of the additional data is processed.

In the example of processing described above, 1-bit additional data is analyzed. However, when the correspondence between 2-bit additional data and DC control bit information is set as shown in FIG. 10, additional data analysis is carried out two bits by two bits. Furthermore, the configuration is possible in which correspondence between 3 or more bits of additional data and DC control bit information is set, or in which correspondence between an arbitrary number of bits in the additional data and DC control bit information is set, and the processing is executed according to the correspondence set as described above.

The present invention is described in detail above with reference to particular embodiments of the present invention. However, it is obvious that those skilled in the art can modify or introduce alternative for the present invention without departing from the gist of the present invention. In other words, the embodiments are described above for the purpose of disclosure, and the present invention is not limited to the embodiments described above. To understand gist of the present invention, claims attached hereto should be referred to.

The series of processing steps described above can be executed by hardware, by software, or by a combination of hardware and software. When the processing sequence is executed by software, a program describing the processing sequence is installed for execution in a memory of a computer with dedicated hardware incorporated therein, or can be installed in a general-purpose computer capable of executing various types of processing.

For instance, the program can previously be recorded in a hard disk or a ROM (Read Only Memory) as a recording medium. Alternatively the program can be stored (recorded) temporally or permanently in a removable recording medium such as a flexible disk, a CD-ROM (Compact Disk Read Only Memory), an MO (Magneto-optical) disk, a DVD (Digital Versatile Disk), a magnetic disk, and a semiconductor memory. The removable recording medium as described above can be provided as the so-called package software.

The program can be installed from the removable recording medium as described above in a computer, and further can be transferred from a down-load site to a computer by means of radio communication, or can be transferred through a wired network such as LAN (Local Area Network) and the Internet to a computer. The computer receives the program transferred as described above and can install the program in a recording medium such as a hard disk or the like incorporated therein.

The various processing steps described above are not only executed time-sequentially according to the descriptions, and can be executed concurrently or discretely according to a processing capability of a device used for the processing or according to the necessity. The term of system as used herein indicates configuration of logical connection of a plurality of devices, and the devices are not always required to be provided within one housing.

INDUSTRIAL APPLICABILITY

As described above, with the configuration according to the present invention, in a recorder/processor capable of recording various types of additional data such as key information used for decoding contents, key production information, contents reproduction control information, and copying control information in an information recording medium, bit values set at a plurality of DC control bit information setting positions in an additional data-associated recording frame as an area for burying additional data therein are decided according to constituent bit information of the additional data. Further in a reproducer according to the present invention, additional constituent bit information can be acquired by detecting bit values at specified DC control bit positions in an additional data-associated recording frame. With the configuration as described above, for instance, the configuration is realized in which additional information such as key information used for decoding contents, key production information, contents reproduction control information, and copying control information is embedded with a format hardly analyzed, yet the data can accurately be read out for reproduction. Therefore, the present invention can be applied to an information recorder/processor, an information reproducer, and an information recording medium used for recording and reproducing contents requiring protection of copyright with the format hardly analyzed with such additional information as key information used for decoding contents, key production information, contents reproduction control information, and copying control information required to be embedded therein.

The invention claimed is:

1. An information recorder/processor comprising:
a modulated data producing section for setting a DC control bit to data to be recorded and executing data modulation to produce a modulated recording frame as a record unit of data; and
a DC control bit specifying section for specifying a bit value set at an additional data-associated DC control bit setting position selected from a plurality of DC control bit setting positions contained in a additional data-associated recording frame based on additional data constituent bit information,
wherein said modulated data producing section executes processing for setting a bit value at the additional data-associated DC control bit position in said additional data-associated recording frame according to an instruction by said DC control bit instruction section,
wherein said DC control bit specifying section decides one bit information selected from a plurality of different DC control bit information corresponding to constituent bit information of one additional data as bit information to be set at an additional data-associated DC control bit position, and also decides that when bit information based on DSV measurement at the additional data-associated DC control bit position is identical to DC control bit information corresponding to additional data constituent bit information to be set, then bit information different from the bit information based on DSV measurement is set at the additional data-associated DC control bit position.

2. The information recorder/processor according to claim 1,
wherein said DC control bit specifying section sets a plurality of DC control bit positions included in said additional data-associated recording frame as additional data-associated DC control bit positions, and decides a plurality of bit values at a plurality of the additional data-associated DC control bit positions based on constituent bit information of the additional data.

3. The information recorder/processor according to claim 1,
wherein said DC control bit specifying section decides one bit information selected from a plurality of different DC control bit information associated to one additional data constituent bit information as bit information set at an additional data-associated DC control bit position, and also decides bit information requiring minimum number of bits changed from bit information based on DSV measurement at the additional data-associated DC control bit position as bit information to be set at the additional data-associated DC control bit position.

4. The information recorder/processor according to claim 1,
wherein said DC control bit specifying section decides different bit information as bit information to be set at the additional data-associated DC control bit position according to a single constituent bit of 0 or 1 in the additional data.

5. The information recorder/processor according to claim 1,
wherein said DC control bit specifying section decides different bit information as bit information to be set at the additional data-associated DC control bit position according to each of a plurality of additional data constituent bit arrays in the additional data.

6. The information recorder/processor according to claim 1,
wherein said additional data is set as constituent information of at least any one of encryption key information, encryption key production information, contents reproduction control information, and content copying control information for contents to be stored in said information recording medium.

7. The information recorder/processor according to claim 1,
wherein said modulated data producing section produces a modulated recording frame by executing data conversion satisfying RLL (1,7) as the run length limited.

8. The information recorder/processor according to claim 1,
wherein said modulated data producing section executes the processing for producing a modulated recording frame, said processing comprises a step of converting 2-bit information to 3-bit information.

9. An information recording medium comprising: a storage section configured to store record data based on a recording frame set with a DC control bit according to DSV control, and record data based on a recording frame associated to additional data with a bit value specified based on constituent bit information of additional data set on a plurality of DC control bit positions,
wherein the DC control bit is one bit information selected from a plurality of different DC control bit information corresponding to constituent bit information of one additional data, as bit information to be set at an additional data-associated DC control bit position, and if bit information based on DSV measurement at the additional data-associated DC control bit position is identical to DC control bit information corresponding to additional data constituent bit information, then the DC control bit information is set to be different from the bit information based on DSV measurement.

10. The information recording medium according to claim 9,
wherein bit information stored at a plurality of DC control bit position based on information associated to additional data in the additional data-associated recording frame is different from bit information based on DSV measurement.

11. The information recording medium according to claim 9,
wherein bit information associated to additional data set in one additional data-associated recording frame indicates a signal constituent bit of 0 or 1 in the additional data.

12. The information recording medium according to claim 9,
wherein bit information associated to additional data set in one additional data-associated recording frame indicates a plurality of constituent bits in the additional data.

13. The information recording medium according to claim 9,
wherein the additional data is stored as at least one of encryption key information, encryption key production information, contents reproduction control information, and contents copying control information for contents to be stored in the information recording medium.

14. The information recording medium according to claim 9,
wherein data based on a modulated recording frame produced by executing data conversion satisfying RLL (1, 7) as the run length limited is recorded therein.

15. The information recording medium according to claim 9,
wherein data based on a modulated recording frame produced by executing conversion of 2-bit information to 3-bit information is recorded therein.

16. A method of information record processing comprising the step of:
specifying a DC control bit for specifying a bit value to be set at an additional data-associated DC control bit position selected from a plurality of additional data-associated DC control bit setting positions included in an additional data-associated recording frame based on a constituent bit information of the additional data;
producing modulated recording frame as a record unit by setting the bit value specified in said DC control bit specifying step at said additional data-associated DC control bit position in the additional data-associated recording frame and executing data modulation; and
recording the modulated recording frame in an information recording medium,
wherein said DC control bit specifying step comprises:
deciding one bit information selected from a plurality of different DC control bit information corresponding to constituent bit information of one additional data as bit information to be set at an additional data-associated DC control bit position, and
deciding that when bit information based on DSV measurement at the additional data-associated DC control bit position is identical to DC control bit information corresponding to additional data constituent bit information to be set, then bit information different from the bit information based on DSV measurement is set at the additional data-associated DC control bit position.

17. The method of information record processing according to claim 16,
wherein the DC control bit specifying section sets a plurality of DC control bit positions included in the additional data-associated recording frame as additional data-associated DC control bit positions and decides a plurality of bit values at the additional data-associated DC control bit positions based on constituent bit information of the additional data.

18. The method of information record processing according to claim 16,
wherein the DC control bit specifying step comprises the steps of:
deciding one bit information selected from a plurality of different DC control bit information associated to one constituent bit information of the additional data as bit information to be set at an additional data-associated DC control bit position; and
deciding bit information requiring minimum change of bits from the bit information based on DSV measurement at the additional data-associated DC control bit information as bit information to be set at the additional data-associated DC control bit position.

19. The method of information record processing according to claim 16,
wherein the DC control bit specifying step comprises the step of deciding different bit information as bit information to be set at the additional data-associated DC control bit position according to a single constituent bit of 0 or 1 of the additional data.

20. The method of information record processing according to claim 16,
wherein the DC control bit specifying step comprises the step of deciding different bit information as bit information to be set at the additional data-associated DC control bit position according to a plurality of additional data constituent bit arrays.

21. The method of information record processing according to claim 16 further comprising the step of setting the additional data as at least any of encryption key information, encryption key production information, contents reproduction control information, and contents copying control information for contents to be stored in the information recording medium.

22. The information recording method according to claim 16,
wherein, in the modulated data producing step, a modulated recording frame is produced by executing data conversion satisfying RLL (1, 7) as the run length limited.

23. The information recording method according claim 16,
wherein the modulated data producing step comprises the step of converting 2-bit information to 3-bit information.

24. A computer readable medium storing a computer readable program for executing information record processing, the computer readable program structured to cause an apparatus to:
specify a DC control bit for specifying a bit value to be set at an additional data-associated DC control bit position selected from a plurality of additional data-associated DC control bit setting positions included in an additional data-associated recording frame based on a constituent bit information of the additional data;
produce a modulated recording frame as a record unit by setting the bit value specified in said DC control bit specifying step at said additional data-associated DC control bit position in the additional data-associated recording frame and executing data modulation;
decide one bit information selected from a plurality of different DC control bit information corresponding to constituent bit information of one additional data as bit information to be set at an additional data-associated DC control bit position, and
decide that when bit information based on DSV measurement at the additional data-associated DC control bit position is identical to DC control bit information corresponding to additional data constituent bit information to be set, then bit information different from the bit information based on DSV measurement is set at the additional data-associated DC control bit position.

* * * * *